(12) United States Patent
Handa et al.

(10) Patent No.: US 6,344,257 B1
(45) Date of Patent: Feb. 5, 2002

(54) AROMATIC POLYAMIDE FILM FOR HIGH-DENSITY MAGNETIC RECORDING MEDIA

(75) Inventors: Makoto Handa; Mitsumasa Ono; Takeo Asai, all of Sagamihara (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/445,772

(22) PCT Filed: Apr. 13, 1999

(86) PCT No.: PCT/JP99/01958

§ 371 Date: Dec. 13, 1999

§ 102(e) Date: Dec. 13, 1999

(87) PCT Pub. No.: WO99/53483

PCT Pub. Date: Oct. 21, 1999

(30) Foreign Application Priority Data

| Apr. 13, 1998 | (JP) | 10-101316 |
| Apr. 15, 1998 | (JP) | 10-104664 |
| May 7, 1998 | (JP) | 10-124829 |
| May 29, 1998 | (JP) | 10-149343 |

(51) Int. Cl.[7] ............................................... G11B 5/66
(52) U.S. Cl. ..................... 428/141; 428/212; 428/323; 428/332; 428/694 ST; 428/694 SL; 428/694 SG; 428/900
(58) Field of Search .................. 428/694 ST, 694 SL, 428/694 SG, 900, 141, 212, 323, 332

(56) References Cited

U.S. PATENT DOCUMENTS

| 4,075,172 A | 2/1978 | Ozawa et al. ................. 260/47 |
| 4,548,855 A | 10/1985 | Ono et al. ................... 428/147 |
| 4,568,600 A | 2/1986 | Ono et al. ................... 428/145 |
| 5,069,962 A | 12/1991 | Okazaki et al. .............. 428/323 |
| 5,080,948 A | 1/1992 | Morita et al. ............... 428/65.3 |
| 5,139,849 A | * 8/1992 | Takagi ......................... 428/143 |
| 5,328,745 A | 7/1994 | Kurihara et al. ............. 428/141 |
| 5,935,674 A | * 8/1999 | Saito .......................... 428/65.3 |
| 5,935,684 A | * 8/1999 | Handa ......................... 428/141 |

FOREIGN PATENT DOCUMENTS

| EP | 124 291 | 11/1984 |
| EP | 787 579 | 8/1997 |

(List continued on next page.)

*Primary Examiner*—Leszek Kiliman
(74) *Attorney, Agent, or Firm*—Sughrue Mion, PLLC

(57) ABSTRACT

An aromatic polyamide film for a high-density magnetic recording medium which has excellent electromagnetic conversion characteristics and few drop outs even when it is used as a base film for a deposited metal thin film magnetic recording medium and enables the production of a large-capacity magnetic recording medium.

An aromatic polyamide film for a high-density magnetic recording medium which has surface flatness and excellent transferability, is thereby useful as a base film especially for a high-density magnetic recording medium and can satisfy contradictory requirements, that is, the prevention of a trouble such as projection of protrusions in a calendering step and winding easiness at the same time.

27 Claims, 1 Drawing Sheet

FOREIGN PATENT DOCUMENTS

| | | |
|---|---|---|
| EP | 0811478 A2 * | 10/1997 |
| EP | 811 478 | 12/1997 |
| EP | 822 220 | 2/1998 |
| JP | 53-32838 | 9/1978 |
| JP | 56-16937 | 2/1981 |
| JP | 58-68223 | 4/1983 |
| JP | 60-180837 | 9/1985 |
| JP | 60-180838 | 9/1985 |
| JP | 60-180839 | 9/1985 |
| JP | 2-214657 | 8/1990 |
| JP | 3-73409 | 3/1991 |
| JP | 3-197021 | 8/1991 |
| JP | 3-80410 | 12/1991 |
| JP | 5-194772 | 8/1993 |
| JP | 5-210833 | 8/1993 |
| JP | 7-80282 | 8/1995 |
| JP | 7-230618 | 8/1995 |
| JP | 9-141798 | 6/1997 |
| JP | 52-39719 | 10/1997 |
| JP | 9-314760 | 12/1997 |
| JP | 9-323386 | 12/1997 |
| JP | 10-6449 | 1/1998 |
| JP | 10-006449 | 1/1998 |
| JP | 10-49852 | 2/1998 |
| JP | 10-049852 | 2/1998 |
| JP | 10-95074 | 4/1998 |
| JP | 10-095074 | 4/1998 |
| JP | 10-151706 | 6/1998 |
| JP | 10-157024 | 6/1998 |
| WO | 97/39876 | 10/1997 |

* cited by examiner

AROMATIC POLYAMIDE FILM FOR HIGH-DENSITY MAGNETIC RECORDING MEDIA

FIELD OF THE INVENTION

The present invention relates to an aromatic polyamide film suitable for use as a base film for a high-density magnetic recording medium. More specifically, it relates to an aromatic polyamide film which is excellent in handling properties such as strength, slipperiness and winding properties, and in chipping resistance, and when used for a high-density magnetic recording medium, the magnetic recording medium has excellent electromagnetic conversion characteristics, drop out resistance, output reduction resistance and traveling durability.

PRIOR ART

In recent years, remarkable progress in a higherdensity has been made in magnetic recording medium, as exemplified by the development and implementation of a metal thin film magnetic recording medium produced by forming a ferromagnetic metal thin film on a non-magnetic base film by a plating method or a physical deposition method such as vacuum vapor deposition or sputtering, and a thin layer coated magnetic recording medium produced by coating needle-shaped magnetic powders such as metal powders or iron oxide powders to a thickness of 2 μm or less.

Known examples of the former include a Co deposited tape (JP-A 54-147010) and a vertical magnetic recording medium comprising a Co—Cr alloy (JP-A 52-134706) whereas known examples of the latter include an extremely thin layer coated magnetic recording medium for high-density magnetic recording (Technical Report MR 94-78 issued by The Institute of Electronics, Information and Communication Engineers (1995-02)) and the like. Since a coated magnetic recording medium of the prior art (a magnetic recording medium produced by coating a mixture of magnetic powders and an organic polymer binder on a non-magnetic base film) has low recording density and a long recording wavelength, the thickness of its magnetic layer is as thick as at about 2 μm or more. On the other hand, a ferromagnetic metal thin film formed by thin film forming means such as vacuum vapor deposition, sputtering or ion plating has an extremely small thickness of 0.2 μm or less. An extremely thin layer coated medium as thin as 0.13 μm has been proposed ever though it comprises a non-magnetic base layer.

In line with this, a non-magnetic base film is also desired to be thin and required to have sufficient strength in the reduced thickness and rigidity which provides an appropriate state of contact with a magnetic recording head. In this respect, an aromatic polyamide film has excellent strength and rigidity in a small thickness causing to high Young's moduli and hence, has been recently used as a base film for a high-density magnetic recording medium frequently.

Meanwhile, in the above high-density magnetic recording medium, the surface condition of the base film exerts a great influence on the surface properties of a magnetic layer. Particularly, in the case of a metal thin film magnetic recording medium, the surface condition of the non-magnetic base film appears directly as the uneven surface of the magnetic layer (magnetic recording layer), thereby causing noise in recording and reproduction signals. Therefore, it is desirable that the surface of the non-magnetic base film be as flat as possible.

On the other hand, from the viewpoints of the formation of a non-magnetic base film and handling properties such as transfer, winding-up and winding-off in the step of film formation, when the surface of the film is too flat, slipperiness between films worsens, a blocking phenomenon occurs, and the roll formation of the base film deteriorates, with the consequence that the yield of products lowers and further, it invites boosting of the production cost of a product. Therefore, if considered from the viewpoint of the production cost, it is desirable that the surface of the non-magnetic base film be as rough as possible.

Further, in the case of a metal thin film magnetic recording medium, a serious problem encountered when it is actually used is the unsatisfactory running properties of the surface of a metal thin film. In the case of a coated magnetic recording medium produced by mixing magnetic powders into an organic polymer binder and coating the resulting mixture on a base film, the running properties of the magnetic layer surface can be improved by dispersing a lubricant in the binder. However, in the case of a metal thin film magnetic recording medium, such measure cannot be taken, and it is extremely difficult to maintain stable running properties. The metal thin film magnetic recording medium has a defect that it is inferior in running properties especially under high-temperature and high-humidity conditions.

Under the circumstances, to produce a high-quality high-density magnetic recording medium, the above two contradictory requirements must be satisfied at the same time.

As means for realizing this, there have been proposed (1) a method for forming a discontinuous coating film by applying a specific coating to the surface of a film (see JP-B 3-80410, JP-A 60-180839, JP-A 60-180838, JP-A60-180837, JP-A 56-16937 and JP-A 58-68223), (2) a method for forming a continuous coating film having a fine uneven surface on the surface of a film (see JP-A 5-194772 and JP-A 5-210833), (3) a method for forming different front and rear surfaces by such a technology as coextrusion (see JP-A 2-214657 and JP-B 7-80282), and (4) a method which combines the above methods (1) and (3) or (2) and (3) (see JP-A 3-73409).

However, although the above conventional methods (1), (2) and (4) for forming a discontinuous coating film and a continuous coating film having a fine uneven surface can solve such problems as blocking and insufficient slipperiness between films, it is difficult to uniformly disperse fine inert particles into a coating film and coarse protrusions are liable to be formed due to agglomerated particles. They still have, therefore, a problem in that the quality of the resulting magnetic tape is instable, as exemplified by deterioration of the electromagnetic conversion characteristics caused by the coarse protrusions. The agglomerated particles are chipped off by their contact with guide rolls in the step of film formation more easily than monodisperse particles, are adhered to and accumulated on a base film to form protrusions, and cause a drop out when it is formed into a magnetic tape.

Though inorganic particles have high hardness and are rarely deformed and accordingly, they are excellent in cleaning a magnetic head and it is easy to obtain fine particles having different sizes, the particles have poor affinity with a polymer and are liable to fall off from the film. On the other hand, organic particles have excellent affinity with a polymer, but they have lower hardness than inorganic particles and the whole particles undergo deformation by heat or mechanical friction. Therefore, the electromagnetic conversion characteristics of a tape containing the organic particles become deteriorated when the tape runs repeatedly.

Further, a thermal load on a tape is becoming greater and greater with high-density packaging as a reduction in the size of a hardware increases. Since the pitch of magnetic recording tracks of a high-density magnetic recording medium in particular is as very narrow as around 10 μm, the dimensional change of a base film caused by thermal history leads to track displacement, resulting in deterioration in electromagnetic conversion characteristics.

DISCLOSURE OF THE INVENTION

It is an object of the present invention to provide an aromatic polyamide film which is excellent in chipping resistance and winding properties in the step of film formation and when it is used in a deposited metal thin film magnetic recording medium, the resulting magnetic recording medium has excellent electromagnetic conversion characteristics, drop out resistance, output reduction resistance and traveling durability.

It is another object of the present invention to provide a laminate film for a high-density magnetic recording medium which prevents the formation of agglomerated particles causing a drop out, and can give a base film for a deposited metal thin film magnetic recording medium that has excellent electromagnetic conversion characteristics and causes few drop outs, and enables the production of a large-capacity magnetic recording medium.

It is still another object of the present invention to provide a transferable thin film which has useful surface flatness and excellent transferability as a base film for a high-density magnetic recording medium and can satisfy contradictory requirements of prevention of projection (being pushed up) of protrusions and winding easiness in a calendering step at the same time.

Other objects and advantages of the present invention will become apparent from the following description.

According to the present invention, firstly, the above objects and advantages of the present invention are attained by an aromatic polyamide film for a high-density magnetic recording medium (may be referred to as "first aromatic polyamide film of the present invention" hereinafter) which film comprises:

(A) a biaxially oriented aromatic polyamide base film of an aromatic polyamide containing substantially no inert fine particles and having a total of Young's moduli in two directions crossing at right angles each other on the film plane of at least 2,000 kg/mm$^2$; and (B) a coating layer comprising inert fine particles having an average particle diameter of 5 to 100 nm and a binder resin and formed on at least one side of the base film, the average particle diameter ($d_B$: nm) of the inert fine particles and the thickness ($t_B$: nm) of the coating layer satisfying the following expression (1):

$$0.05 \leq t_B/d_B \leq 0.8 \quad (1)$$

and the coating layer having protrusions on its surface at a density of $1 \times 10^6$ to $1 \times 10^8$/mm$^2$.

Secondly, the above objects and advantages of the present invention are attained by an aromatic polyamide film for a high-density magnetic recording medium (may be referred to as "second aromatic polyamide film of the present invention" hereinafter) which film comprises:

(A) a biaxially oriented aromatic polyamide base film of an aromatic polyamide containing substantially no inert fine particles and having a total of Young's moduli in two directions crossing at right angles each other crossing on the film plane of at least 2,000 kg/mm$^2$; and (B) a coating layer made comprising inert fine particles, a surfactant and a binder resin and formed on at least one side of the base film, the surfactant consisting of a first surfactant having an HLB value of 10 to 14 and a second surfactant having an HLB value of 16 to 18.5, the average HLB value of the first surfactant and the second surfactant being 15 to 18, and the contents of each of the first surfactant and the second surfactant in the coating layer being 0.1 to 15 wt % and 10 to 40 wt % in terms of solids.

Thirdly, the above objects and advantages of the resent invention are attained by a transferable aromatic polyamide film for a high-density magnetic recording medium (an aromatic polyamide film comprising a laminate base film (A1) may be referred to as "third aromatic polyamide film of the present invention" and an aromatic polyamide film comprising a biaxially oriented aromatic polyamide base film (A2) may be referred to as "fourth aromatic polyamide film" hereinafter), which film comprises:

(A) (A1) a laminate base film which comprises a biaxially oriented aromatic polyamide film of an aromatic polyamide containing substantially no inert fine particles, a total of Young's moduli in two directions crossing at right angles each other on the film plane being at least 2,000 kg/mm$^2$, and a first coating layer of 0.01 to 45 wt % of inert fine particles having an average particle diameter of 1 to 300 nm and a binder resin and formed on one side of the polyamide film, or (A2) a biaxially oriented aromatic polyamide base film of an aromatic polyamide containing internal inert fine particles composed of a compound represented by the following formula (2):

wherein $M^1$ is the elemental metal of the group Ia or IIa of the periodic table and x is 1 or 2, or a compound represented by the following formula (3):

wherein $M^1$ is the same as defined above and y is ½ or 1, and having an average particle diameter of 5 to 1,500 nm, a total of Young's moduli in two directions crossing at right angles each other on the film plane being at least 2,000 kg/mm$^2$; and (B) a second coating layer comprising two types of inert fine particles having different average particle diameters and a binder resin and formed on a side devoid of the coating layer of the laminate base film (A1) or one side of the biaxially oriented aromatic polyamide base film (A2), the two types of inert fine particles consisting of first inert fine particles having an average particle diameter of 100 to 1,000 nm and second inert fine particles having an average particle diameter of 5 to 100 nm, the ratio of the average particle diameter of the first inert fine particles to the average particle diameter of the second inert fine particles being 1.2 or more, the contents of each of the first inert fine particles and the second inert fine particles in the second coating layer being 0.01 to 40 wt % and 1 to 70 wt % in terms of solids, the total of the contents of both particles being 75 wt % or less, and the thickness of the second coating layer being 1 nm or more but not more than the average particle diameter of the second inert fine particles.

DETAILED DESCRIPTION OF THE INVENTION

Figure 1:
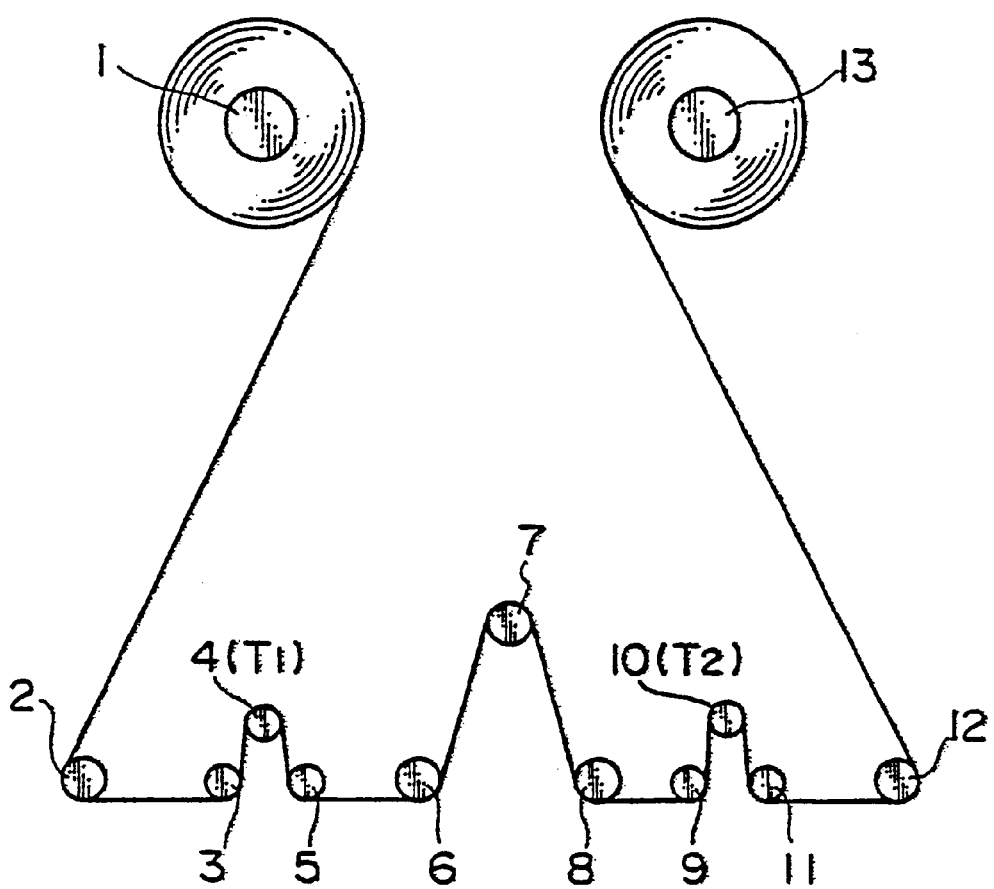
FIG. 1 is a schematic diagram of a device for measuring the chipping resistance of a film.

The first aromatic polyamide film of the present invention will first be described hereinafter.

Any aromatic polyamides are acceptable in the present invention if their main chains have aromatic nuclei and amide bond groups as the main constituent components. Of the aromatic polyamides, an aromatic polyamide having para-oriented aromatic nuclei substituent which formes the main chain of the aromatic polyamide and accounts for 50 to 99.5% of the total of aromatic nuclei forming the main chain is preferred for application in magnetic recording media which require strength. When the para-oriented aromatic nuclei substituent accounts for less than 50%, strength is apt to be insufficient, while when it accounts for more than 99.5%, stretching becomes difficult. The main chain forming substituent is, for example, an atom or a group of atoms contained in the main chain of a polymer, such as an amide group, as exemplified by —C(=O)—NH—, —O—, —CH$_2$—, —C(CH$_3$)$_2$—, —SO$_2$—, —S—, and other aromatic nuclei directly bonded to the above aromatic nuclei. The term "para-oriented" means "1,4-substituted" when the aromatic nucleus is a phenylene group and "1,4-substituted or 2,6-substituted" when the aromatic nucleus is a naphthylene group. Particularly, the aromatic polyamide is preferably a polymer compound represented by the general formula —(—C(=O)—Ar$_1$—C(=O)—NH—Ar$_2$—NH—)$_k$—(—C(=O)—Ar$_3$—C(=O)—NH—Ar$_4$—Y$_1$—Ar$_5$—NH)$_1$—(—C(=O)—Ar$_6$—NH—)$_m$—(—C(=O)—Ar$_7$—Y$_2$—Ar$_8$—NH—)$_n$—, wherein k, l, m and n are 0 or positive integer, Ar$_1$, Ar$_2$, Ar$_3$, Ar$_4$, Ar$_5$, Ar$_6$, Ar$_7$ and Ar$_8$ are each an aromatic nucleus represented by the general formula —C$_6$H$_p$R$_{4-p}$—, —C$_6$H$_p$R$_{4-p}$— C$_6$H$_p$R$_{4-p}$— or —C$_{10}$H$_q$R$_{6-q}$— (wherein p is an integer of 0 to 4, q is an integer of 0 to 6, R is an atom or a group of atoms selected from a halogen group, nitro group, cyano group, alkyl group having 1 to 4 carbon atoms, alkoxy group having 1 to 3 carbon atoms and trialkylsilyl group) and may be the same or different, and Y$_1$ and Y2 are each an atom or a group of atoms selected from O, CH$_2$, C(CH$_3$)$_2$, SO$_2$, S and CO and may be the same or different. A polymer compound comprising terephthalic acid as an acid component and p-phenylenediamine and 3,4'-diaminodiphenyl ether as amine components is more preferred.

The aromatic polyamide in the present invention may be copolymerized with an aliphatic or alicyclic polyamide-forming compound in limits that do not impair the physical properties of the film. The aromatic polyamide may further be copolymerized a compound having at least 3 amide-forming functional groups. A lubricant, antioxidant and other additives and other polymers may be blended into the aromatic polyamide.

The aromatic polyamide base film in the present invention is a biaxially oriented film which has preferably been stretched to 5.0 times or more, more preferably 6.0 to 10.0 times in terms of area stretch ratio. When the stretch ratio is small, high strength cannot be obtained. By biaxial orientation, the sum of Young's moduli in a longitudinal direction and a transverse direction of the aromatic polyamide base film is controlled to 2,000 kg/mm$^2$ or more, preferably 2,200 kg/mm$^2$ or more. When the sum of Young's moduli in a longitudinal direction and a transverse direction is less than 2,000 kg/mm$^2$, the state of contact of the film with a recording head becomes improper, whereby electromagnetic conversion characteristics deteriorate and a base film having a thickness in the order of several micrometers cannot achieve sufficient strength. The Young's moduli in each of a longitudinal direction and a transverse direction are preferably 600 kg/mm$^2$ or more, more preferably 800 kg/mm$^2$ or more, particularly preferably 1,000 kg/mm$^2$ or more. The upper limit of the Young's modulus in each direction is 3,500 kg/mm$^2$.

The coating layer B comprising the inert particles (b) having an average particle diameter (d$_B$) of 5 to 100 nm and a binder resin must be formed on the surface of the aromatic polyamide base film.

The average particle diameter d$_B$ of the inert particles b contained in the coating layer B in the present invention is 5 to 100 nm, preferably 10 to 50 nm. It is preferred that the inert particles b have a uniform particle size distribution. When the average particle diameter is smaller than 5 nm, slipperiness and chipping resistance deteriorate and a block phenomenon occurs at the time of winding the resulting film into a roll. On the other hand, when the average particle diameter is larger than 100 nm, the particles fall off and chipping resistance worsens. Further, it becomes difficult to use the obtained film for a high-density magnetic recording medium due to large spacing between the film and a magnetic head.

The ratio (t$_B$/d$_B$) of the thickness t$_B$ (nm) of the coating layer B to the average particle diameter d$_B$ of the inert particles b is 0.05 to 0.8, preferably 0.08 to 0.6, more preferably 0.1 to 0.5. When the ratio (t$_B$/d$_B$) is larger than 0.8, the protrusion formation of the inert particles b lowers and the traveling durability of a magnetic recording medium formed from the obtained film becomes insufficient. On the other hand, when the ratio (t$_B$/d$_B$) is smaller than 0.05, the particles on the surface of the laminate film are chipped off by their contact with guide rolls in the step of film formation, resulting in insufficient traveling durability, and the chipped particles are adhered to and accumulated on the surface of the film, causing an increase in the number of drop outs.

The inert particles bare contained in the coating layer B in such an amount that the density of protrusions on the surface of the coating layer B should be 1×10$^6$ to 1×10$^8$/mm$^2$. When the density of surface protrusions is lower than 1×10$^6$/mm2, the traveling durability of a magnetic recording medium formed from the obtained film becomes insufficient. On the other hand, when the density exceeds 1×10$^8$/ mm$^2$, it exerts a bad influence upon electromagnetic conversion characteristics. The density of the surface protrusions is preferably 2×10$^6$ to 5×10$^7$/mm$^2$, more preferably 3.0×10$^6$ to 3.0×10$^7$/mm$^2$.

When the first aromatic polyamide film of the present invention is heated at 200° C. for 120 minutes, the surface roughness of the coating layer B before and after the heat treatment preferably satisfies the following expressions (4) and (5) at the same time from the viewpoints of durability and electromagnetic conversion characteristics.

$$0 \leq (ARa_B - ARa_B^H)/ARa_B < 0.4 \tag{4}$$

$$0.1 < ARa_B^H 7 \tag{5}$$

wherein ARa$_B$ is the center plane average roughness (nm) of the surface of the coating layer B before the heat treatment measured by an atomic force microscope and ARa$_B^H$ is the center plane average roughness (nm) of the surface of the coating layer B after the heat treatment measured by the atomic force microscope.

Further, the number of foreign substances adhered to the surface of the coating layer B is preferably 100/100 cm2 or less to prevent a drop out and optimize a processing step.

Each of the inert particles b contained in the coating layer B of the present invention is preferably a particle whose exterior is softer than its interior (to be referred to as "core-shell particle" hereinafter). The core-shell particle means a multi-layer structured particle whose interior and exterior are made from different materials. In this case, the term "multi-layer" means at least two layers and the properties of the particle may change continuously in a radial direction. It is presumed that the exterior of the particle (to be referred to as "shell portion" hereinafter) has the function of adhering strongly to the base portion of the film through its reaction with the base portion of the film after it is coated on the surface of the film, or through its reaction, melting, softening or deformation caused by a heat treatment and that the interior of the particle (to be referred to as "core portion" hereinafter) has the function of providing appropriate slipperiness and optimal spacing between a magnetic head and the film together with the shell portion as a particle. To assign the above functions of each of the shell portion and core portion, the shell portion is required to have excellent affinity with the base portion of the film and appropriate physical, chemical and thermal properties at a drying temperature and the core portion is required not to be deformed by mechanical friction or the like and to have relatively high hardness compared with the shell portion or the base layer film.

The material of the core portion of the core-shell particle b is, for example, an organic material such as polystyrene, polystyrene-divinylbenzene, polymethyl methacrylate, methyl methacrylate copolymer, methyl methacrylate crosslinked copolymer, polytetrafluoroethylene, polyvinylidene fluoride, polyacrylonitrile or benzoguanamine resin, or inorganic material such as silica, alumina, titanium dioxide, kaolin, talc, graphite, calcium carbonate, feldspar, molybdenum disulfide, carbon black or barium sulfate.

The material of the shell portion is preferably a thermoplastic resin, particularly preferably an acrylic resin, polyester resin or the like. To improve affinity with the base portion of the film, a thermoplastic resin containing a functional group having reactivity or affinity with the base portion of the film, such as a carboxyl group, hydroxyl group, glycidyl group, amide group, epoxy group or isocyanate group, introduced into the molecule in an optional proportion is more preferred. These functional groups may be used alone or in combination of two or more according to circumstances. The glass transition temperature (to be abbreviated as Tg hereinafter) of the shell portion is preferably 80° C. or lower, more preferably 20° C. or lower. When Tg is higher than 80° C., a large number of core-shell particles fall off from the film. By using the above polymer in the shell portion, excellent chipping resistance can be obtained.

The volume shape coefficient (f) of the core-shell particle of the present invention is preferably 0.1 to π/6, more preferably 0.4 to π/6. The volume shape coefficient (f) of the particle is defined by the following equation (6):

$$f = V/R^3 \qquad (6)$$

wherein f is a volume shape coefficient, V is the volume (μm³) of each of the particles, and R is the average particle diameter (μm) of the particles.

The particle having a coefficient (f) of π/6 is globular (spherical). When the particle has a coefficient (f) of 0.4 to π/6, it is substantially globular (spherical) or oval like a rugby ball. When the particle has a coefficient (f) of less than 0.1, it is flake-like and hence, it is difficult to obtain sufficient traveling durability.

The core-shell particle b can be produced by emulsion polymerizing a polymerizable monomer for the shell portion in a system where the core portion of the particle is existent to cover the particle surface of the core portion. However, the core-shell particle b is not limited by this particle production process.

The ratio ($t_B/d_{cB}$) of the thickness $t_B$ (nm) of the coating layer B to the diameter $d_{cB}$ of the core portion of the core-shell particle b is 0.05 to 0.8, preferably 0.08 to 0.6, more preferably 0.1 to 0.5. When the ratio ($t_B/d_{cB}$) is larger than 0.8, the protrusion-forming function of the core-shell particle b lowers and the traveling durability of a magnetic recording medium formed from the obtained film becomes insufficient. On the other hand, when the ratio is smaller than 0.05, the particles on the surface of the laminate film are chipped off by their contact with various guide rolls in the step of film formation with the result that traveling durability becomes insufficient and chipped particles are adhered to and accumulated on the surface of the film, thereby increasing the number of drop outs.

The density of protrusions having a height of 0.5 μm or more formed by the macro-agglomerates of the core-shell particles b is 50/cm² or less, preferably 40/cm² or less, more preferably 30/cm² or less. When the density of the protrusions is higher than 50/cm², the protrusions become the cause of a drop out when a magnetic tape is formed from the film having these protrusions.

The binder resin forming the coating layer B in the present invention is not limited to a particular kind and particular composition if it does not impair the effect of the present invention. An aqueous resin is preferably used from the viewpoints of the control of physical properties, the convenience of process control, work environment and external environmental protection.

The aqueous resin is preferably a water-soluble organic resin or water dispersible organic resin. Illustrative examples of the aqueous resin include water-soluble resins such as acrylic resins, polyester resins, acryl-polyester resins, alkyd resins, phenolic resins, epoxy resins, amino resins, polyurethane resins, vinyl acetate resins and vinyl chloride-vinyl acetate copolymers, and water dispersions of water-insoluble resins of the above resins. These aqueous resins may be homopolymers, copolymers or mixtures.

The coating layer B in the present invention can be formed by coating a coating solution, preferably aqueous coating solution, containing inert fine particles and a binder resin on at least one side of the aromatic polyamide base film A, and drying it. The solids content of the coating solution is preferably 0.2 to 10 wt %, more preferably 0.5 to 5 wt %, particularly preferably 0.7 to 3 wt %. The coating solution, preferably aqueous coating solution, may contain other components such as a surfactant, stabilizer, dispersant, UV absorber and viscosity enhancer as required in such a range that do not impair the effect of the present invention.

Coating is preferably carried out on the aromatic polyamide film after a stretching and heat treatment, which will be described hereinafter, in such a manner that the coating film should not be heated excessively. As for the conditions of drying the coating film after coating, the coating film is preferably passed through a drying furnace heated at 100 to 300° C. for 1 second to 30 minutes. Coating method is not particularly limited but it is preferably roll coating, die coating or the like.

Known processes such as interfacial polymerization, solution polymerization and the like may be employed to produce the above aromatic polyamide. Of these, solution polymerization is preferred. At least one selected from dimethylformamide, dimethylacetamide, N-methylpyrrolidone, N-methylcaprolactam, dimethyl sulfoxide, hexamethylphosphoryl triamide, tetramethylurea and 1,3-dimethyl-2-imidazolidinone may be used as the main component of a polymerization solvent. To improve the solubility of the polymer, an inorganic salt such as calcium chloride, lithium salt or the like may be added in a suitable amount before, during or after polymerization. Although an acid component and an amine component are reacted with each other in substantially equal molar amounts, either of the components may be used excessively for the purpose of controlling the degree of polymerization or the like. A small amount of a monofunctional acid component or amine component may be used as a terminal capping agent. An aliphatic or aromatic amine or a quaternary ammonium salt may be added to a polymerization system to capture hydrogen chloride formed by a reaction. After the end of the reaction, a basic inorganic compound such as sodium hydroxide, calcium hydroxide or calcium oxide is added as required to carry out a neutralization reaction.

Processes for producing the above aromatic polyamide are detailed in JP-B 52-39719 and JP-B 53-32838, for example, and these known knowledge may be employed.

The aromatic polyamide film of the present invention preferably has a logarithmic viscosity (obtained from a value measured at 30° C. in concentrated sulfuric acid) of 0.5 g/dl or more, more preferably 1.0 g/dl or more to achieve excellent mechanical properties.

The thus obtained aromatic polyamide can be obtained by putting an aromatic polyamide into a solvent such as an alcohol or water, re-precipitating and separating it. Although the obtained aromatic polyamide may be used to mold a film by dissolving it in a solvent again, the solution obtained by a polymerization reaction is preferably used directly or after its concentration is suitably controlled after polymerization. The control of concentration can be carried out by concentrating or diluting with other solvent. The solvent may be the same as those listed for the polymerization solvent but it does not always have to be the same.

The film forming stock solution prepared as described above is subjected to a film formation by a so-called "solution film forming process". The solution film forming process includes a dry-wet process, a dry process and a wet process all of which can be employed, but the dry-wet process and the dry process are preferred to obtain a film having good surface properties.

To form a film by the wet process, the stock solution is preferably extruded into a film forming bath directly from a nozzle, or first excluded onto a substrate such as a drum and then introduced into a wet-type bath together with the substrate. This bath is generally formed of an aqueous medium, and may contain an organic solvent and an inorganic salt in addition to water. A salt, organic solvent and the like contained in the film can be extracted by passing the film through the wet-type bath. The time required to pass the film through the wet-type baths, is preferably 10 seconds to 30 minutes, though it depends on the thickness of the film. Further, the film is stretched in a longitudinal direction, followed by drying, stretching in a transverse direction and heating. These treatments are generally carried out at 100 to 500° C. for a total of 1 second to 30 minutes.

To form a film by the dry-wet process, the stock solution is extruded from a nozzle onto a substrate such as a drum or endless belt to form a thin film, and the solvent is scattered out from the thin film to dry the thin film until it achieves self-holding properties. The drying conditions include a drying temperature of room temperature to 300° C. and a drying time of 60 minutes or less. The film undergone the drying step is peeled off from the substrate, introduced into a wet step where a salt, a solvent and the like are removed as in the above wet process, and further stretched, dried and heated to form a final film.

When the dry process is used, a film which has been dried on a drum or endless belt to achieve self-holding properties is peeled off from the substrate, dried to remove the residual solvent, stretched and heated. These treatments are carried out at 100 to 500° C. for a total of 1 second to 30 minutes. A film having a thickness of 0.1 to 20 $\mu$m, preferably 0.5 to 10 $\mu$m is generally obtained.

The first aromatic polyamide film of the present invention may comprise, for example, a slippery coating layer C containing inert particles or an aromatic polyamide film A' containing inert particles formed on the film A surface opposite to the coating layer B by a known process as required.

A deposited magnetic recording medium for high-density recording having excellent electromagnetic conversion characteristics, especially output at a short wavelength range, S/N and C/N, few drop outs and a small error rate can be obtained from the first aromatic polyamide film of the present invention by forming a ferromagnetic metal thin film layer made from iron, cobalt, chromium, an alloy or an oxide essentially composed of these on the surface of the layer B by a vacuum deposition, sputtering or ion plating, further successively forming a protective layer made from diamond-like carbon (DLC) and a fluorine-containing carboxylic acid-based lubricant layer on the surface of the ferromagnetic metal thin layer as required according to purpose and application, and then forming a known back coat layer on a surface opposite to the layer B or the surface of the coating layer C. This deposited magnetic recording medium is extremely useful as a tape medium for Hi8 for recording analog signals, and digital video cassette recorders (DVC), data 8 mm and DDSIV for recording digital signals.

A metal coated magnetic recording medium for high-density recording having excellent electromagnetic conversion characteristics, especially output at a short wavelength range, S/N and C/N, few drop outs and a small error rate can be obtained from the first aromatic polyamide film of the present invention by uniformly dispersing iron or needle-shaped fine magnetic powders containing iron as the main component, or needle- shaped fine magnetic powders such as iron oxide or chromium oxide, or flaky fine magnetic powders such as barium ferrite in a binder such as vinyl chloride or vinyl chloride-vinyl acetate copolymer, coating the resulting dispersion on the surface of the layer B so as to form a magnetic layer having a thickness of 1 $\mu$m or less, preferably 0.1 to 1 $\mu$m, and forming a back coat layer on a surface opposite to the layer B or the surface of the coating layer C by a known process. As required, a non-magnetic layer may be formed as an under layer for the metal powder-containing magnetic layer by dispersing fine titanium oxide particles or the like in the same organic binder as that for the magnetic layer and coating the resulting dispersion on the surface of the layer B. This metal coated magnetic recording medium is extremely useful as a tape medium for 8 mm video, Hi8, $\beta$-cam SP and W-VHS for recording analog signals, and digital video cassette recorders (DVC), data 8 mm, DDSIV, digital $\beta$-cam, D2, D3 and SX for recording digital signals, and a high-density oxide coated magnetic recording medium for data streamer QIC for recording digital signals.

The above W-VHS can be used as a VTR for recording analog HDTV signals and the above DVC as a VTR for recording digital HDTV signals. It can be said that the laminate film of the present invention is an extremely useful base film for magnetic recording media for VTRs for these HDTV signals.

A description is subsequently given of the second aromatic polyamide film of the present invention. It is to be understood that the description of the aromatic polyamide of the first aromatic polyamide film is directly applied to the second aromatic polyamide film.

The coated layer B will be then described below.

The second aromatic polyamide film of the present invention has a coating layer B comprising a binder resin, inert fine particles and two different surfactants which differ from each other in HLB value on one side of the aromatic polyamide base film A. The two different surfactants are a first surfactant having an HLB value of 10 to 14 and a second surfactant having an HLB value of 16 to 18.5. The average HLB value of the two surfactants is 15 to 18.

The binder resin used herein is preferably at least one polymer selected from the group consisting of an aqueous polyester resin, aqueous acrylic resin, aqueous polyurethane resin and a combination thereof. Of these, an aqueous polyester resin is preferred.

The aqueous polyester resin is, for example, a polyester resin comprising a polycarboxylic acid such as isophthalic acid, phthalic acid, 1,4-cyclohexanedicarboxylic acid, 2,6-naphthalenedicarboxylic acid, 4,4'-diphenyldicarboxylic acid, adipic acid, sebacic acid, dodecanedicarboxylic acid, succinic acid, 5-sodium sulfoisophthalic acid, 2-potassium sulfoterephthalic acid, trimellitic acid, trimesic acid, monopotassium trimellitate or p-hydroxybenzoic acid as an acid component and a polyhydroxy compound such as ethylene glycol, diethylene glycol, propylene glycol, 1,4-butanediol, 1,6-hexanediol, 1,4-cyclohexane dimethanol, p-xylylene glycol, dimethylolpropionic acid or addition product of bisphenol A with ethylene oxide as a glycol component; graft polymer or block copolymer having an acrylic polymer chain bonded to a polyester chain, acryl modified polyester resin in which two different polymers form a specific physical structure (IPN, core-shell) in the micro-particle, or the like.

The binder resin in the present invention is preferably a binder resin which is dissolved, emulsified or finely dispersed in water. The binder resin is more preferably a binder resin which is emulsified or finely dispersed in water. A sulfonate group, carboxylate group, polyether unit or the like may be introduced into the molecule of the binder resin to provide hydrophilic nature.

Although the inert fine particles are not limited to a particular type, they preferably have relatively low specific gravity that they hardly settle in the coating solution. Preferred examples of the inert fine particles include heat resistant polymer (such as a crosslinked silicone resin, crosslinked acrylic resin, crosslinked polystyrene, melamine.formaldehyde resin, aromatic polyamide resin, polyamide-imide resin, crosslinked polyester, wholly aromatic polyester or the like) particles, silicone dioxide (silica), calcium carbonate and the like. Of these, crosslinked silicone resin particles, silica and core-shell organic particles (core: crosslinked polystyrene, shell: polymethyl methacrylate) are preferred.

These inert fine particles preferably have an average particle diameter of 10 to 50 nm. The amount of the inert fine particles used is preferably such that the density of surface protrusions formed by the inert fine particles on the surface of the coating layer B should be $2 \times 10^6$ to $2 \times 10^7/mm^2$. Traveling durability can be further improved by this protrusion density. The average particle diameter of the inert fine particles is more preferably 15 to 45 nm, much more preferably 18 to 40 nm. The density of surface protrusions is preferably $2.5 \times 10^6$ to $1.8 \times 10^7/mm^2$, more preferably $3 \times 10^6$ to $1.5 \times 10^7/mm^2$.

The surfactant in the present invention consists of two types of surfactants having different HLB values as described above, that is, the first surfactant having an HLB value of 10 to 14 and the second surfactant having an HLB value of 16 to 18.5, and the average HLB value of these is 15 to 18. When only one surfactant is used, the formation of protrusions which are derived from agglomerated particles and cause a drop out cannot be suppressed and coating problems such as coating failures, bubble stripes and the like caused by cissing cannot be solved.

The HLB value of the first surfactant out of the above surfactants is preferably 10.5 to 13.5, more preferably 11.0 to 13.0. The HLB value of the second surfactant is preferably 16.5 to 18.3, more preferably 17.0 to 18.0. The average (average HLB value) of the combined HLB values of these surfactants is preferably 15.5 to 17.5, more preferably 16 to 17.5.

The first and second surfactants are preferably a nonionic surfactant, particularly preferably a nonionic surfactant comprising (poly)ethylene oxide added or bonded to an alkyl alcohol, alkylphenyl alcohol, higher fatty acid or the like.

Illustrative examples of the first surfactant include Nonion NS-208.5 (HLB 12.6), NS-206 (HLB 10.9), HS-208 (HLB 12.6) and HS-210 (HLB 13.6) of NOF Corporation, Octapole 60 (HLB 11.3), Octapole 80 (HLB 12.4) and Octapole 95 (HLB 13.3), Octapole 100(HLB 13.6), Dodecapole 90 (HLB 12.0) and Dodecapole 120 (HLB 13.4) of Sanyo Chemical Industries, Ltd. as polyoxyethylene alkylphenyl ether-based compounds, Nonion P-210 (HLB 12.9) of NOF Corporation and Nonipole Soft SS-50 (HLB 10.5), SS-70 (HLB 12.8), SS-90 (HLB 13.2), DO-70 (HLB 12.3) and DO-90 (HLB 13. 4) of Sanyo Chemical Industries, Ltd. as polyoxyethylene alkyl ether-based compounds, and Nonion L-4 (HLB 13.1), S-4 (HLB 11.6) and S-6 (HLB 13.6) of NOF Corporation as the polyoxyethylene ester-based compounds of higher fatty acids.

Illustrative examples of the second surfactant include Nonion NS-230 (HLB 17.2), NS-240 (HLB 17.8), HS-220 (HLB 16.2) and HS-240 (HLB 17.9) of NOF Corporation and Nonipole 200 (HLB 16.0), Nonipole 400 (HLB 17.8), Nonipole 500 (HLB 18.2) and Octapole 400 (HLB 17.9) of Sanyo Chemical Industries, Ltd. as polyoxyethylene alkylphenyl ether-based compounds, and Nonion E-230 (HLB 16.6), K-220 (HLB 16.2) and K-230 (HLB 17.3) of NOF Corporation as polyoxyethylene alkyl ether-based compounds, and Nonion S-15.4 (HLB 16.7) and S-40 (HLB 18.2) of NOF Corporation as the polyoxyethylene ester-based compounds of higher fatty acids.

The first surfactant is preferably used in an amount of 0.1 to 15 wt %, more preferably 0.65 to 10 wt %, particularly preferably 0.85 to 5 wt % based on the solids content of the coating solution. The second surfactant is preferably used in an amount of 10 to 40 wt %, more preferably 12 to 36 wt %, particularly preferably 15 to 30 wt % based on the solids content of the coating solution.

When the HLB value of the first surfactant is smaller than 10 or the amount thereof is larger than 15 wt % (based on the total solids content of the coating layer B), the coating solution is readily foamed at the time of coating, thereby causing a defect of formation of stripe-shaped coating defects. On the other hand, when the HLB value of the first surfactant is larger than 14 or the amount thereof is smaller than 0.5 wt % (based on the total solids content of the coating layer B), its function of reducing the surface tension of the coating solution becomes small, thereby forming coating failures at the time of applying the coating solution.

When the HLB value of the second surfactant is smaller than 16 or the amount thereof is smaller than 10 wt % (based on the total solids content of the coating layer B), the formation of protrusions which may cause a drop out cannot be suppressed. When the HLB value is larger than 18.5, coating failures are produced and when the amount is larger than 40 wt % (based on the total solids content of the coating layer B), defect of formation of stripe-shaped coating defects is caused by foaming.

Further, when the average HLB value of the surfactants is smaller than 15, protrusions which may cause a drop out are formed and when the average HLB value is larger than 18, coating failures are produced.

The coating layer B in the present invention can be formed by applying a coating solution, preferably water-soluble coating solution on at least one side of the aromatic polyamide base film A, containing inert fine particle, surfactants and a binder resin, and drying it. The solids content of the coating solution is preferably 0.2 to 10 wt %, more preferably 0.5 to 5 wt %, particularly preferably 0.7 to 3 wt %. This coating solution, preferably water-soluble coating solution, may contain other components such as a surfactant, stabilizer, dispersant, UV absorber and viscosity enhancer as desired in such a range that do not impair the effect of the present invention.

Coating is preferably carried out on the aromatic polyamide film after a stretching and heat treatment, which will be described hereinafter, in such a manner that the coating film should not be heated excessively. As for the conditions of drying the coating film after coating, the coating film is preferably passed through a drying furnace heated at 30 to 300° C. for 1 second to 30 minutes. Coating method is not particularly limited but it is preferably roll coating, die coating or the like.

A deposited magnetic recording medium for high-density recording having excellent electromagnetic conversion characteristics, especially output at a short wavelength range, S/N and C/N, few drop outs and a small error rate can be obtained from the second aromatic polyamide film of the present invention by forming a ferromagnetic metal thin film layer made from iron, cobalt, chromium, an alloy or an oxide essentially composed of these on the surface of the coating layer B by a vacuum deposition, sputtering or ion plating, further successively forming a protective layer made from diamond-like carbon (DLC) and a fluorine-containing carboxylic acid-based lubricant layer on the surface of the ferromagnetic metal thin layer as required according to purpose and application, and then forming a known back coat layer on the surface of the coating layer B. This deposited magnetic recording medium is extremely useful as a tape medium for Hi8 for recording analog signals, and digital video cassette recorders (DVC), data 8 mm and DDSIV for recording digital signals.

A description is subsequently given of the third aromatic polyamide film of the present invention. The third aromatic polyamide film consists of a laminate base film (A1) and a second coating layer (B). The laminate base film (A1) comprises a biaxially oriented aromatic polyamide film and a first coating layer formed on one side of the aromatic polyamide film. The first coating layer provides transferability to the third aromatic polyamide film.

It is to be understood that the description of the aromatic polyamide of the first aromatic polyamide film is directly applied to the third aromatic polyamide film.

Since it was not described in the foregoing that the aromatic polyamide contains substantially no inert particles, it will be described hereinunder.

In the present invention, means of allowing inert fine particles from not to be substantially contained include a method of controlling the amount of a neutralizing agent so as to make the particle diameter of the inert particles to null in the step of adding a neutralizing agent in the production process of the aromatic polyamide, a method of reducing the particle size, a method of adjusting the pH of a reaction system to an acidic level, or a method of making the reaction time sufficiently long. The means of reducing the particle size of the inert fine particle is not particularly limited but it may be a method which comprises dispersing the particles in a solvent, grinding them with a sand grinder or the like and filtering the dispersion to remove coarse particles. Since when the inert fine particles are not contained in the film, film flatness can be obtained to achieve excellent electromagnetic conversion characteristics and excellent running properties can be obtained by a particle-containing coating layer which will be described hereinafter, this is advantageously employed in an obtained film application which must have flatness and appropriate roughness for durability at the same time, like in a case of a metal thin film magnetic recording medium.

Thereafter, a first thin coating layer is formed on one side of the aromatic polyamide film to ensure transferability (transportationality) and a second coating layer is formed on the opposite side. The coating layer is preferably formed on the aromatic polyamide film after a stretching and heat treatment in such a manner that the coating film should not be heated excessively. As for the conditions of drying the coating film after coating, the coating film is preferably passed through a drying furnace heated at 30 to 230° C. for 1 to 10 seconds. Coating method is not particularly limited but it is preferably roll coating, die coating or the like. The coating order is not limited but coating is preferably carried out on both sides almost at the same time and dried at the same time.

When the first coating layer or the second coating layer is not formed, an aromatic polyamide film which has an extremely flat surface due to substantially no existence of particles comes into direct contact to guide rolls in the film formation step or processing step, and such troubles as wrinkling and break occur due to the extremely low slipperiness of the aromatic polyamide film. Further, since deaeration properties and slipperiness between films deteriorate, it becomes difficult to obtain a nicely rolled film. Further, when the film is rolled, a blocking phenomenon easily occurs.

When both the first coating layer and the second coating layer are not formed, the slipperiness of the obtained film becomes too low, thereby making it impossible to roll the film in the step of film formation.

The average particle diameter (dx) of the inert fine particles X contained in the first coating layer is 1 to 300 nm, preferably 5 to 250 nm, particularly preferably 10 to 200 nm. When the average particle diameter dx of the inert fine particles X is smaller than 1 nm, the effect of providing slipperiness is not obtained, while when the average particle diameter is larger than 300 nm, the electromagnetic conversion characteristics of a magnetic tape obtained from the resulting film deteriorate.

The content of the inert fine particles X in the first coating layer is preferably 0.01 to 45 wt %, more preferably 1 to 40 wt %, particularly preferably 2 to 35 wt %. When the content of the inert fine particles X is smaller than 0.01 wt %, the density of the formed protrusions becomes too low and hence, slipperiness is not improved, while when the content of the inert fine particles X is larger than 45 wt %, a large number of inert fine particles fall off from the coating layer and stain the step.

Although the inert fine particles X contained in the first coating layer are not limited to a particular type, they preferably have relatively low specific gravity so that they hardly settle in the coating solution. Preferred examples of the inert fine particles X include heat resistant polymer (such as a crosslinked silicone resin, crosslinked acrylic resin, crosslinked polystyrene, melamine.formaldehyde resin, aromatic polyamide resin, polyamide-imide resin, crosslinked polyester, wholly aromatic polyester or the like) particles, silicone dioxide (silica), calcium carbonate and the like.

A core-shell particle whose exterior is softer than its interior is preferably used as the inert fine particle X. The core-shell particle which has been described with regard to the first aromatic polyamide film is used as the core-shell particle.

The inert fine particle X is not limited to a particular shape but it is preferably globular or a shape close to a globular shape to form efficient protrusions. The inert fine particles X preferably have a narrow particle size distribution with a relative standard deviation of 0.5 or less, more preferably 0.3 or less, particularly preferably 0.2 or less. When the relative standard deviation of the particle size distribution is larger than 0.5, the roughness of the formed surface becomes large to exert an adverse influence on electromagnetic conversion characteristics, and the particles easily fall off from the film when the film contacts the rolls in the production process, causing a drop out when a magnetic tape is formed from the resulting film.

In the first coating layer of the present invention, a binder resin is used to firmly adhere the inert fine particles X. The binder resin is preferably an aqueous polyester resin, aqueous acrylic resin, aqueous polyurethane resin or the like. Of these, an aqueous polyester resin is particularly preferred. As for what is not described herein of the binder resin and the aqueous polyester resin, it is to be understood that the description of the second aromatic polyester film is applied.

The thickness ($t_A$) of the first coating layer in the present invention is dx/100 (nm) or more and less than dx (nm), preferably dx/50 (nm) or more and less than dx (nm), more preferably dx/30 (nm) or more and less than dx (nm). When $t_A$ is less than dx/100 (nm), it is difficult to hold the inert fine particles contained in the first coating layer in the coating film with the result that the inert fine particles fall off from the coating film. When only the thickness of the coating layer is reduced to less than dx/100 (nm) without increasing the content of the inert fine particles, the distance between the inert fine particles becomes too large, resulting in deteriorated slipperiness and anti-block properties. When the thickness is dx (nm) or more, the inert fine particles X do not fully exhibit the effect of improving slipperiness. Since the number of particles (in a thickness direction) increases as the thickness becomes larger, a projection phenomenon readily occurs in the calendering step.

In the present invention, the second coating layer containing two different types of inert fine particles Y and Z which differ from each other in average particle diameter is formed on the other side of the aromatic polyamide film. The average particle diameter dy of the inert fine particles Y having a larger average particle diameter, of the two different types of inert fine particles contained in the second coating layer, is 100 to 1,000 nm, preferably 105 to 800 nm, particularly preferably 110 to 500 nm. The average particle diameter dz of the inert fine particles Z having a smaller average particle diameter is 5 to 100 nm, preferably 10 to 95 nm, particularly preferably 15 to 90 nm. The ratio (dy/dz) of these average particle diameters is 1.2 or more, preferably 1.3 or more, particularly preferably 1.4 or more. The upper limit of the ratio is not particularly limited but it is preferably 100 or less from the viewpoints of the particle diameter ranges of the inert fine particles Y and the inert fine particles Z and the thickness of the coating film.

When the average particle diameter dy of the inert fine particles Y is smaller than 100 nm, a space capable of removing air captured at the time when the film is rolled cannot be formed between the films, thereby causing such problems as the shifting of film toward left or right and wrinkling of the film. When the average particle diameter dy of the inert fine particles Y is larger than 1,000 nm, the inert fine particles Y easily fall off from the second coating layer, thereby staining the contacting rolls in the film formation step or processing step. A projection phenomenon easily occurs in the calendering step.

When the average particle diameter dz of the inert fine particles Z is smaller than 5 nm, the roll formation of the film is not well made and anti-block properties deteriorate because slipperiness between the films cannot be improved. On the other hand, when the average particle diameter dz of the inert fine particles Z is larger than 100 nm, the roll formation of the film worsens and anti-block properties deteriorate as well. When the ratio (dy/dz) of the average particle diameters is smaller than 1.2, the heights of protrusions formed on the second coating layer become almost uniform, thereby making it impossible to ensure sufficient deaeration properties.

The content of the inert fine particles Y in the second coating layer is 0.01 to 40 wt %, preferably 0.05 to 35 wt %, particularly preferably 0.1 to 30 wt %. The content of the inert fine particles Z is 1 to 70 wt %, preferably 5 to 60 wt %, particularly preferably 7 to 50 wt %. The total content of the inert fine particles Y and the inert fine particles Z in the second coating layer is 75 wt % or less, preferably 65 wt % or less, particularly preferably 60 wt % or less. The lower limit of the total content is preferably 1 wt %, more preferably 3 wt %, particularly preferably 5 wt %.

When the content of the inert fine particles Y is smaller than 0.01 wt %, the density of protrusions becomes too small, whereby films are adhered to each other and air captured between films cannot be removed, while when the content is larger than 40 wt %, a large number of particles fall off from the coating layer, thereby staining the process. When the content of the inert fine particles Z is smaller than 1 wt %, slipperiness between films deteriorate with the result of a worsened roll formation of the film, while when the content is larger than 70 wt %, the inert fine particles easily fall off from the coating film. When the total content of the inert fine particles Y and the inert fine particles Z is larger than 75 wt %, the proportion of the binder resin becomes too small and thereby the inert fine particles extremely easily fall off.

Although the inert fine particles Y and the inert fine particles Z contained in the second coating layer are not limited to particular types, they preferably have relatively low specific gravity so that they hardly settle in the coating solution. Preferred examples of the inert fine particles include heat resistant polymer (such as a crosslinked silicone resin, crosslinked acrylic resin, crosslinked polystyrene, melamine.formaldehyde resin, aromatic polyamide resin, polyamide-imide resin, crosslinked polyester, wholly aromatic polyester or the like) particles, silicon dioxide (silica), calcium carbonate and the like. The inert fine particles Y and the inert fine particles Z may be the same or different in kind.

The above two different types of inert fine particles Y and Z are not limited to a particular shape but they are preferably globular or a shape close to a globular shape to form efficient protrusions. The inert fine particles preferably have a narrow particle size distribution with a relative standard deviation of 0.5 or less, more preferably 0.3 or less, particularly preferably 0.2 or less. If the relative standard deviation of the particle size distribution is larger than 0.5, the particles easily fall off when the film comes to contact with path rolls in the production process and chippings cause a drop out when a magnetic tape is formed from the resulting film.

In the second coating layer of the present invention a binder resin is used to firmly adhere the above two different types of inert fine particles. This binder resin is preferably identical to the binder resin used in the first coating layer.

The binder resin contained in the first coating layer may be the same or different in type from the binder resin contained in the second coating layer.

In the present invention, the thickness ($t_B$) of the second coating layer in the present invention is 4 (nm) or more and less than dz (nm). When $t_B$ is less than 4 (nm), it is difficult to hold the inert fine particles Y contained in the second coating layer in the coating film with the result that the inert fine particles fall off. When only the thickness of the second coating layer is reduced without changing the total content of the inert fine particles Y and the inert fine particles Z, the distance between the inert fine particles becomes too large, resulting in deteriorated slipperiness, deaeration properties and anti-block properties. When the thickness of the second coating layer is larger than the average particle diameter dz of the inert fine particles Z therein, adding of the inert fine particles Z do not fully exhibit the effect of improving slipperiness and anti-block properties. Since the number of inert fine particles contained (in a thickness direction) increases as the thickness of the second coating layer becomes larger, a projection phenomenon readily occurs in the calendering step with the result that the electromagnetic conversion characteristics of a magnetic tape formed from the obtained film deteriorate.

The first coating layer in the present invention is formed on one side of the aromatic polyamide film by applying a coating solution, preferably aqueous coating solution, containing the above inert fine particles X and the binder resin, and drying the coating film whereas the second coating layer is formed on the other side of the film by applying a coating solution, preferably aqueous coating solution, containing the above inert fine particles Y and Z and the binder resin, and drying the coating film. The solids content of each of the coating solutions is preferably 1 to 10 wt %, more preferably 1.5 to 8 wt %, particularly preferably 2 to 6 wt %. The coating solutions (preferably aqueous coating solutions) may contain other components such as a surfactant, stabilizer, dispersant, UV absorber, viscosity enhancer and the like as desired.

The thus obtained third aromatic polyamide film of the present invention preferably has a friction coefficient between surface of the first coating layer and surface of the second coating layer of 0.6 or less and an deaeration index of 6,000 seconds or less, particularly preferably 5,000 seconds or less. Thereby, a film roll having a nice form can be obtained when the third aromatic polyamide film is rolled.

The transferable third aromatic polyamide film of the present invention has excellent transferability in the film formation step and processing step and excellent winding properties even though its surface is extremely flat, and is extremely useful for magnetic application and other application because particles on the traveling surface do not project toward the other side even under severe processing conditions, for example, calendering conditions and especially suitable for use as a base film for a deposited high-density magnetic recording medium. This deposited magnetic recording medium is extremely useful as a tape medium for Hi8 for recording analog signals, and digital video cassette recorders (DVC), data 8 mm and DDSIV for recording digital signals.

A description is finally given of the fourth aromatic polyamide film of the present invention. The fourth aromatic polyamide film comprises an aromatic polyamide base film (A2) containing internal inert fine particles and a second coating layer (B).

The aromatic polyamide base film in the present invention contains internal inert fine particles having an average particle diameter of 5 to 1,500 nm, preferably 10 to 1,300 nm, more preferably 30 to 1,000 nm.

The inert fine particles are composed of a compound represented by the following formula (2):

$$M^1(OH)_x \qquad (2)$$

wherein $M^1$ is the elemental metal of the group Ia or IIa of the periodic table and x is 1 or 2, or a compound represented by the following formula (3):

$$M^1(CO_3)_y \qquad (3)$$

wherein $M^1$ is the same as defined above and y is ½ or 1.

Since the internal inert fine particles are obtained as the residual neutralizing agent in the step of polymerizing an aromatic polyamide and completely dispersed in a system in the stage of a polymerization step, there is no possibility of agglomeration of the particles, which may be cause of chipping off. When the average particle diameter of the internal inert fine particles in film is smaller than 5 nm, the effect of forming surface protrusions produced by particles is small and sufficient handling properties such as slipperiness and winding properties cannot be obtained. When the average particle diameter is larger than 1,500 nm, voids formed by stretching become too large and thereby chipping resistance may deteriorate. The inorganic particles have an average particle diameter of 10 to 3,000 nm, preferably 30 to 1,500 nm when they are added as a neutralizing agent. When the average particle diameter is smaller than 10 nm, the effect of forming surface protrusions produced by particles is small and sufficient handling properties such as slipperiness and winding properties cannot be obtained. When the average particle diameter is larger than 3,000 nm, the particle size of the residue after a neutralization reaction becomes large and voids formed by stretching become too large, whereby chipping resistance may deteriorate.

The internal inert fine particles are derived from the compound of the above formula (2) or (3) used in an amount larger than its stoichiometric amount in order to neutralize hydrogen chloride by-produced in the production of the aromatic polyamide by an acid-chloride process.

In the present invention, means of making the average particle diameter of the inorganic particles contained in the film satisfy the above range is not particularly limited but it is preferably a method of controlling the amount of the neutralizing agent to be added and the particle diameter so that pH of the reaction system can give the above average particle diameter, in the step of adding the neutralizing agent.

Means of controlling the particle diameter of each of the inorganic particles is not particularly limited but it is preferably a method comprising dispersing the particles in a solvent, grinding them with a device such as a sand grinder, and filtering the dispersion to remove coarse particles.

When the above inorganic particles are contained in such an amount that the density of protrusions on the surface of the film becomes $1 \times 10^2$ to $1 \times 10^8/mm^2$, the obtained film is preferably used for such application as a magnetic recording medium that requires both flatness for obtaining excellent electromagnetic conversion characteristics and appropriate surface roughness for obtaining excellent running properties and durability.

To produce the above aromatic polyamide, known processes such as interfacial polymerization and solution polymerization can be employed. Of these, solution polymerization is preferred. At least one selected from dimethylformamide, dimethylacetamide, N-methylpyrrolidone, N-methylcaprolactam, dimethyl sulfoxide, hexamethylphosphoryl triamide, tetramethylurea and 1,3-dimethyl-2-imidazolidinone may be used as the main component of a polymerization solvent. To improve the solubility of the polymer, an inorganic salt such as calcium chloride, lithium salt or the like may be added in a suitable amount before, during or after polymerization. Although an acid component and an amine component are reacted with each other in substantially equal molar amounts, either of the components may be used excessively for the purpose of controlling the degree of polymerization or the like. A small amount of a monofunctional acid component or amine component may be used as a terminal capping agent. An aliphatic or aromatic amine or a quaternary ammonium salt may be added to a polymerization system to capture hydrogen chloride formed by a reaction. An ultraviolet absorber, dye, release agent and other additives may be further added within a range that do not impair the effect of the present invention. After termination of the reaction, the above inorganic particles having an average particle diameter of 10 to 3,000 nm, preferably 30 to 1,500 nm and represented by the above formula (2) or (3) are added to carry out a neutralization reaction.

As for what is not described of the aromatic polyamide, it is to be understood that the description of the first aromatic polyamide is directly applied.

The second coating layer is formed on one side of the aromatic polyamide base film in the present invention. It is preferred to coat the aromatic polyamide film after a stretching and heat treatment in such a manner that the coating film should not be heated excessively and to dry the coating film after application. As for the drying conditions, the coating film is preferably passed through a drying furnace heated at 30 to 230° C. for 1 second to 10 minutes. Coating method is not particularly limited but it is preferably roll coating, die coating or the like.

It is to be understood that the description of the second coating layer with regard to the third aromatic polyamide film is directly applied to the fourth aromatic polyamide film.

The transferable fourth aromatic polyamide film of the present invention has excellent transferability in the film formation step and processing step and excellent winding properties even though its surface is extremely flat, and is extremely useful for magnetic application and other application because particles on the traveling surface do not project toward the other side even under severe processing conditions, for example, calendering conditions, and especially suitable for use as a base film for a coated high-density magnetic recording medium.

EXAMPLES

The following examples are given to further illustrate the present invention. Measurement methods employed in Examples 1 to 7 and Comparative Examples 1 to 9 are as follows.

(1) Average Particle Diameter I of Particles (Average Particle Diameter: 0.06 μm or More)

This is measured using the CP-50 model centrifugal particle size analyzer of Shimadzu Corporation. A particle diameter, "equivalent spherical diameter" equivalent to 50 wt %, is read from a cumulative curve of the particles of each diameter and the amount thereof calculated based on the obtained centrifugal sedimentation curve and taken as average particle diameter (refer to "Particle Size Measurement Technology" issued by Nikkan Kogyo Press, pp. 242–247, 1975).

(2) Average Particle Diameter II of Particles (Average Particle Diameter: Less than 0.06 μm)

Particles having an average particle diameter smaller than 0.06 μm which form small protrusions are measured by a light scattering method. That is, it is expressed by the "equivalent spherical diameter" of particles which account correspond to the particle size at the point of 50 wt % of the total of all particles, obtained by the NICOMP Model 270 SUBMICRON PARTICLE SIZER of Nicomp Instruments Inc.

(3) Volume Shape Factor (f)

A photo of each particle is taken with a magnification suitable for each size by a scanning electron microscope and the average particle diameter and volume of the particles are calculated from the photo using a Luzex 500 image analyzer of Nippon Regulator Co., Ltd. to obtain the volume shape factor f of the particle from the following expression (6).

$$f = V/R^3 \qquad (6)$$

wherein f is a volume shape factor, V is the volume ($\mu m^3$) of the particles and R is the average particle diameter ($\mu m$) of the particles.

(4) Density of Protrusions

The measurement of the density of protrusions on the surface of a film is carried out using a scanning electron microscope. That is, 25 photos of the surface of the layer B of the film are taken at random at a magnification of 5,000× to count the density of surface protrusions, and the number of protrusions per 1 $mm^2$ is calculated from the average of count values and taken as the density of protrusions on the surface of the layer B.

(5) Height and Density of Protrusions Produced by Macro-agglomerates

A thin aluminum film is formed on the coating layer B to have a thickness of 0.2 μm from an inclination angle of 45° by a vacuum deposition method, and a 1 $cm^2$ area of the film is scanned by a transmission microscope at a magnification of 400× to count the number of transmission beams having the maximum length (corresponding to the height of a protrusion) of 0.2 mm or more of non-metallized portions formed by the shadows of protrusions. That is, the density of protrusions formed by coarse macro-agglomerates having a height of 0.2 mm/400=0.5 μm or more is counted.

(6) AFM Center Plane Average Roughness (ARa)

Using the J scanner of the Nano Scope III atomic force microscope (AFM) of Digital Instruments Co., ARa (center plane average roughness) calculated under the following conditions are measured. Subsequently, the sample is heated in a gear oven at 200° C. for 120 minutes to measure its ARa in the same manner.

probe: single bond silicon sensor
scanning mode: tapping mode
scanning area: 5 μm×5 μm
number of pixels: 256×256 data points
scanning rate: 2.0 Hz measurement environment: room temperature, in the air
(7) Young's Modulus Using a Tensilon tensile tester of Toyo Baldwin Co., Ltd. a sample film having a length of 300 mm and a width of 12.7 mm is pulled at a strain rate of 10%/min in a chamber whose temperature is adjusted to 20° C. and humidity to 50%, and the Young's modulus of the film is calculated from the following equation (7) using an first straight line portion of the obtained tensile stress-strain curve.

$$E=\Delta\sigma/\Delta\epsilon \qquad (7)$$

wherein E is a Young's modulus ($kg/mm^2$), $\Delta\sigma$ is a stress difference between stresses of two points on a straight line in terms of the original average cross section, and $\Delta\epsilon$ is a strain difference between the above two points.

(8) Production and Evaluation of Characteristic Properties of Magnetic Tape

Two layers of 100% cobalt ferromagnetic thin film are formed on the surface of the coating layer B to have a total thickness of 0.2 μm (each layer has a thickness of about 0.1 μm) by a vacuum vapor deposition method. A diamond-like carbon (DLC) film and a fluorine-containing carboxylic acid-based lubricant layer are formed sequentially on the surface of the thin film layers, and a back coat layer is further formed on a surface, opposite to the layer B, of an aromatic polyamide film by a known method. Thereafter, the resulting laminate is slit into a 8 mm wide tape which is then loaded into a commercial 8 mm video cassette. Then, the characteristic properties of this tape are measured using the following commercial measurement instruments.

Instruments Used 8 mm video tape recorder: EDV-6000 of Sony Corporation C/N measurement: a noise meter of Shibasoku Co., Ltd.

(i) C/N Measurement

A signal having a recording wavelength of 0.5 μm (frequency of about 7.4 MHz) is recorded, and the ratio of values of its reproduced signal at 6.4 MHz and 7.4 MHz is taken as the C/N of the tape which is a relative value when the C/N of a deposited tape for a commercial 8 mm video is 0 dB.

◎: +2 dB or more
○: –2 to less than +2 dB
X: –4 to less than –2 dB
XX: less than –4 dB (ii) Traveling Durability Image signals having a frequency of 4.2 MHz are recorded on the above deposited tape which is then caused to run repeatedly 200 times and then, a change in the output of the signal is checked. At this test, one time running is carried out at a running speed of 41 m/min and a re-winding speed of 41 m/min under conditions of 25° C. and 50% RH. The traveling durability of the film is evaluated from the output change based on the following criteria.

◎: The output change is 0 dB to –0.3 dB or more, after 200 times of traveling.
○: The output change is less than –0.3 dB to –0.5 dB or more, after 200 times of traveling.
Δ: The output change is less than –0.5 dB to –0.7 dB or more, after 200 times of traveling.
X: The output change is less than –0.7 dB, after 200 times of traveling.

Example 1

A polymer solution (logarithmic viscosity of 3.5) as a film forming stock solution was obtained by polymerizing 25 mol % of paraphenylenediamine and 25 mol % of 3,4'-diaminodiphenyl ether as amine components and 50 mol % of terephthalic acid chloride as an acid component in NMP (N-methylpyrrolidone) and neutralizing the obtained polymer with calcium hydroxide.

This stock solution was cast on a metal belt heated at 100° C., dried at 100° C. for 2 minutes and further dried, while elevating temperature stepwise to 120° C. and 150° C., for a total time of 10 minutes to give an unstretched film having self-holding properties. This unstretched film was peeled off from the belt continuously and introduced into a water tank to remove the solvent and the salt.

The obtained unstretched film was stretched to 2.5 times in a longitudinal direction between low-speed and high-speed rolls at a film temperature of 350° C., and then supplied to a stenter to be stretched to 3.0 times in a transverse direction at 400° C. The obtained biaxially oriented film was heat-treated at 400° C. for 1 minute and cooled to room temperature to give a film A. A coating solution having a solids content of 1.0 wt % (the content of particles in total solids being 2.0 wt %) prepared by dispersing particles of resin (crosslinked acryl) obtained by crosslinking polymethyl methacrylate with divinylbenzene, the particles having an average particle diameter of 30 nm, into an aqueous solution of an acryl modified polyester resin binder was applied to this film A in a coating amount of 1.35 $g/m^2$ in terms of coating solution state with a roll coater, then heated gradually and dried at a maximum temperature of 210° C. for 30 seconds to produce an aromatic polyamide base film having a final thickness of 3.0 μm and a 0.010 μm thick coating layer B. A ferromagnetic metal thin film deposited magnetic tape was obtained by the above method, using this aromatic polyamide base film having the coating layer B. The characteristic properties of the aromatic polyamide base film having the coating layer B and the ferromagnetic metal thin film deposited magnetic tape comprising this film are shown in Table 1.

Examples 2 and 3

Aromatic polyamide base films were obtained in the same manner as in Example 1 except that the stretch ratio of the film A was changed as shown in Table 1. The characteristic properties of the obtained films and ferromagnetic metal thin film deposited magnetic tapes comprising these films are shown in Table 1.

Examples 4 to 9

Aromatic polyamide base films were obtained in the same manner as in Example 1 except that the types of particles and/or the content of particles in total solids in the coating layer B were changed as shown in Table 1. The characteristic properties of the obtained films and ferromagnetic metal thin film deposited magnetic tapes comprising these films are shown in Table 1.

TABLE 1

| | PDA*/3,4'-DAPE** ratio | stretch ratios | total of Young's moduli (longitudinal + transverse) | coating solution for coating layer B | | | | |
|---|---|---|---|---|---|---|---|---|
| | | | | type of binder *** | average type of particles **** | particle diameter ($d_B$) | amount of particles /solids | solids content |
| Ex. 1 | 25/25 mol % | 2.5 × 3.0 = 7.5 | 2500 kg/mm$^2$ | Acr-Pes | crosslinked acryl | 30 nm | 2.0 wt % | 1.0 wt % |
| Ex. 2 | 25/25 mol % | 2.0 × 3.25 = 6.5 | 2350 kg/mm$^2$ | Acr-Pes | crosslinked acryl | 30 nm | 2.0 wt % | 1.0 wt % |
| Ex. 3 | 25/25 mol % | 2.8 × 2.8 = 7.8 | 2600 kg/mm$^2$ | Acr-Pes | crosslinked acryl | 30 nm | 2.0 wt % | 1.0 wt % |
| Ex. 4 | 25/25 mol % | 2.5 × 3.0 = 7.5 | 2500 kg/mm$^2$ | Acr-Pes | crosslinked acryl | 60 nm | 16.0 wt % | 1.0 wt % |
| Ex. 5 | 25/25 mol % | 2.5 × 3.0 = 7.5 | 2500 kg/mm$^2$ | Acr-Pes | crosslinked acryl | 15 nm | 0.25 wt % | 1.0 wt % |
| Ex. 6 | 25/25 mol % | 2.5 × 3.0 = 7.5 | 2500 kg/mm$^2$ | Acr-Pes | core-shell particle (A) | 30 nm | 2.0 wt % | 1.0 wt % |
| Ex. 7 | 25/25 mol % | 2.5 × 3.0 = 7.5 | 2500 kg/mm$^2$ | Acr-Pes | core-shell particle (B) | 30 nm | 2.0 wt % | 1.0 wt % |
| Ex. 8 | 25/25 mol % | 2.5 × 3.0 = 7.5 | 2500 kg/mm$^2$ | Acr-Pes | silica | 45 nm | 2.0 wt % | 1.0 wt % |
| Ex. 9 | 25/25 mol % | 2.5 × 3.0 = 7.5 | 2500 kg/mm$^2$ | Acr-Pes | silica | 15 nm | 2.0 wt % | 1.0 wt % |

| | coating layer | | | | center plane average roughness (AFM) | | | tape characteristics | |
|---|---|---|---|---|---|---|---|---|---|
| | amount of coating before drying | thickness after drying ($t_B$) | $t_B/d_B$ | density of protrusions (number/mm$^2$) | $ARa_B$ | $ARa_B^H$ | $ARa_B - ARa_B^H$ | C/N | traveling durability |
| Ex. 1 | 1.35 g/m$^2$ | 10 nm | 0.33 | 1.3 × 10$^7$ | 2.2 nm | 1.6 nm | 0.27 | ◉ | ○ |
| Ex. 2 | 1.35 g/m$^2$ | 10 nm | 0.33 | 1.3 × 10$^7$ | 2.1 nm | 1.6 nm | 0.24 | ◉ | ○ |
| Ex. 3 | 1.35 g/m$^2$ | 10 nm | 0.33 | 1.3 × 10$^7$ | 2.4 nm | 1.7 nm | 0.29 | ◉ | ○ |
| Ex. 4 | 1.35 g/m$^2$ | 10 nm | 0.17 | 1.0 × 10$^7$ | 3.9 nm | 3.0 nm | 0.23 | ○ | ◉ |
| Ex. 5 | 1.35 g/m$^2$ | 10 nm | 0.67 | 1.7 × 10$^7$ | 1.2 nm | 1.0 nm | 0.16 | ◉ | ○ |
| Ex. 6 | 1.35 g/m$^2$ | 10 nm | 0.33 | 1.4 × 10$^7$ | 2.2 nm | 1.4 nm | 0.36 | ◉ | ○ |
| Ex. 7 | 1.35 g/m$^2$ | 10 nm | 0.33 | 1.4 × 10$^7$ | 2.2 nm | 0.8 nm | 0.64 | ◉ | Δ |
| Ex. 8 | 1.35 g/m$^2$ | 10 nm | 0.22 | 3.7 × 10$^6$ | 3.7 nm | 3.5 nm | 0.05 | ○ | ◉ |
| Ex. 9 | 1.35 g/m$^2$ | 10 nm | 0.67 | 8.5 × 10$^7$ | 1.3 nm | 1.2 nm | 0.08 | ◉ | ◉ |

Ex. = Example

Examples 10 to 13

Aromatic polyamide base films were obtained in the same manner as in Example 1 except that the solids content or the amount of coating in a coating solution for the coating layer B were changed as shown in Table 2. The characteristic properties of the obtained films and ferromagnetic metal thin film deposited magnetic tapes comprising these films are shown in Table 2.

Examples 14 and 15

Aromatic polyamide base films were obtained in the same manner as in Example 1 except that the binder resin in the coating layer B was changed as shown in Table 2. The characteristic properties of the obtained films and ferromagnetic metal thin film deposited magnetic tapes comprising these films are shown in Table 2.

Examples 16 and 17

Aromatic polyamide base films were obtained in the same manner as in Example 1 except that the copolymer composition of the amine components of the aromatic polyamide of the film A was changed as shown in Table 2. The characteristic properties of the obtained films and ferromagnetic metal thin film deposited magnetic tapes comprising these films are shown in Table 2.

TABLE 2

| | PDA*/3,4'-DAPE** ratio | stretch ratios | total of Young's moduli (longitudinal + transverse) | coating solution for coating layer B | | | | |
|---|---|---|---|---|---|---|---|---|
| | | | | type of binder *** | type of particles **** | average particle diameter ($d_B$) | amount of particles /solids | solids content |
| Ex. 10 | 25/25 mol % | 2.5 × 3.0 = 7.5 | 2500 kg/mm$^2$ | Acr-Pes | crosslinked acryl | 30 nm | 2.0 wt % | 2.0 wt % |
| Ex. 11 | 25/25 mol % | 2.5 × 3.0 = 7.5 | 2500 kg/mm$^2$ | Acr-Pes | crosslinked acryl | 30 nm | 2.0 wt % | 0.5 wt % |

TABLE 2-continued

| | | | | | | | | | |
|---|---|---|---|---|---|---|---|---|---|
| Ex. 12 | 25/25 mol % | 2.5 × 3.0 = 7.5 | 2500 kg/mm² | Acr-Pes | crosslinked acryl | 30 nm | | 2.0 wt % | 1.0 wt % |
| Ex. 13 | 25/25 mol % | 2.5 × 3.0 = 7.5 | 2500 kg/mm² | Acr-Pes | crosslinked acryl | 30 nm | | 2.0 wt % | 1.0 wt % |
| Ex. 14 | 25/25 mol % | 2.5 × 3.0 = 7.5 | 2500 kg/mm² | Pes | crosslinked acryl | 30 nm | | 2.0 wt % | 1.0 wt % |
| Ex. 15 | 25/25 mol % | 2.5 × 3.0 = 7.5 | 2500 kg/mm² | Pur | crosslinked acryl | 30 nm | | 2.0 wt % | 1.0 wt % |
| Ex. 16 | 37.5/12.5 mol % | 2.5 × 3.0 = 7.5 | 2800 kg/mm² | Acr-Pes | crosslinked acryl | 30 nm | | 2.0 wt % | 1.0 wt % |
| Ex. 17 | 12.5/37.5 mol % | 2.5 × 3.0 = 7.5 | 2300 kg/mm² | Acr-Pes | crosslinked acryl | 30 nm | | 2.0 wt % | 1.0 wt % |

| | coating layer | | | | center plane average roughness (AFM) | | | tape characteristics | |
|---|---|---|---|---|---|---|---|---|---|
| | amount of coating before drying | thickness after drying ($t_B$) | $t_B/d_B$ | density of protrusions (number/mm²) | $ARa_B$ | $ARa_B^H$ | $ARa_B - ARa_B^H$ $ARa_B$ | C/N | traveling durability |
| Ex. 10 | 1.35 g/m² | 20 nm | 0.67 | 1.1 × 10⁷ | 2.0 nm | 1.5 nm | 0.25 | ◉ | ○ |
| Ex. 11 | 1.35 g/m² | 5 nm | 0.17 | 1.9 × 10⁷ | 2.7 nm | 2.0 nm | 0.26 | ◉ | ○ |
| Ex. 12 | 2.7 g/m² | 20 nm | 0.67 | 1.1 × 10⁷ | 2.0 nm | 1.5 nm | 0.25 | ◉ | ○ |
| Ex. 13 | 0.675 g/m² | 5 nm | 0.17 | 1.9 × 10⁷ | 2.7 nm | 2.0 nm | 0.26 | ◉ | ◉ |
| Ex. 14 | 1.35 g/m² | 10 nm | 0.33 | 1.3 × 10⁷ | 2.2 nm | 1.6 nm | 0.27 | ◉ | ○ |
| Ex. 15 | 1.35 g/m² | 10 nm | 0.33 | 1.3 × 10⁷ | 2.2 nm | 1.6 nm | 0.27 | ◉ | ○ |
| Ex. 16 | 1.35 g/m² | 10 nm | 0.33 | 1.3 × 10⁷ | 2.2 nm | 1.6 nm | 0.27 | ◉ | ○ |
| Ex. 17 | 1.35 g/m² | 10 nm | 0.33 | 1.3 × 10⁷ | 2.2 nm | 1.6 nm | 0.27 | ○ | ○ |

Ex. = Example

Comparative Example 1

An aromatic polyamide base film was obtained in the same manner as in Example 1 except that silica having an average particle diameter of 430 nm and beforehand dispersed in NMP was added to a polymerization system after the completion of a neutralization reaction in the polymerization step to prepare a film forming stock solution. The characteristic properties of the obtained film and a ferromagnetic metal thin film deposited magnetic tape comprising this film are shown in Table 3. This film was inferior in electromagnetic conversion characteristics because its surface smoothness was impaired by large protrusions formed by particles contained in the film, especially coarse protrusions formed by the agglomerates of the particles.

Comparative Example 2

An aromatic polyamide base film was obtained in the same manner as in Example 1 except that a dried unstretched film was not stretched. The characteristic properties of the obtained film and a ferromagnetic metal thin film deposited magnetic tape comprising this film are shown in Table 3. This unstretched film was inferior in electromagnetic conversion characteristics due to its low Young's moduli.

Comparative Example 3

An aromatic polyamide base film was obtained in the same manner as in Example 1 except that the coating layer B was not formed. The characteristic properties of the obtained film and a ferromagnetic metal thin film deposited magnetic tape comprising this film are shown in Table 3. This film was inferior in traveling durability due to lack of fine protrusions.

Comparative Example 4

An aromatic polyamide base film was obtained in the same manner as in Example 1 except that particles were not contained in the coating layer B. The characteristic properties of the obtained film and a ferromagnetic metal thin film deposited magnetic tape comprising this film are shown in Table 3. This film was inferior in traveling durability due to lack of fine protrusions.

Comparative Examples 5 to 9

Aromatic polyamide base films were obtained in the same manner as in Example 1 except that the type of particles and/or the content of the particles in total solids and/or the solids content of the coating solution and/or the amount of coating in the coating layer B were changed as shown in Table 3. The characteristic properties of the obtained films and ferromagnetic metal thin film deposited magnetic tapes comprising these films are shown in Table 3. These films were inferior in electromagnetic conversion characteristics or traveling durability because the particle diameter of the particles and/or the density of protrusions were outside the ranges of the present invention.

TABLE 3

| | PDA*/3,4'-DAPE** ratio | stretch ratios | total of Young's moduli (longitudinal + transverse) | coating solution for coating layer B ||||| 
|---|---|---|---|---|---|---|---|---|
| | | | | type of binder *** | type of particles **** | average particle diameter ($d_B$) | amount of particles /solids | solids content |
| C. Ex. 1 | 25/25 mol % | 2.5 × 3.0 = 7.5 | 2500 kg/mm² | Acr-Pes | crosslinked acryl | 30 nm | 2.0 wt % | 1.0 wt % |
| C. Ex. 2 | 25/25 mol % | 1.0 × 1.0 = 1.0 | 1200 kg/mm² | Acr-Pes | crosslinked acryl | 30 nm | 2.0 wt % | 1.0 wt % |
| C. Ex. 3 | 25/25 mol % | 2.5 × 2.5 = 7.5 | 2500 kg/mm² | — | — | — | — | — |
| C. Ex. 4 | 25/25 mol % | 2.5 × 3.0 = 7.5 | 2500 kg/mm² | Acr-Pes | — | — | — | 1.0 wt % |
| C. Ex. 5 | 25/25 mol % | 2.5 × 3.0 = 7.5 | 2500 kg/mm² | Acr-Pes | crosslinked acryl | 120 nm | 7.5 wt % | 1.0 wt % |
| C. Ex. 6 | 25/25 mol % | 2.5 × 3.0 = 7.5 | 2500 kg/mm² | Acr-Pes | crosslinked acryl | 30 nm | 0.1 wt % | 1.0 wt % |
| C. Ex. 7 | 25/25 mol % | 2.5 × 3.0 = 7.5 | 2500 kg/mm² | Acr-Pes | crosslinked acryl | 20 nm | 45.0 wt % | 1.0 wt % |
| C. Ex. 8 | 25/25 mol % | 2.5 × 3.0 = 7.5 | 2500 kg/mm² | Acr-Pes | crosslinked acryl | 30 nm | 2.0 wt % | 0.2 wt % |
| C. Ex. 9 | 25/25 mol % | 2.5 × 3.0 = 7.5 | 2500 kg/mm² | Acr-Pes | crosslinked acryl | 30 nm | 2.0 wt % | 5.0 wt % |

| | coating layer ||| | | center plane average roughness (AFM) ||| tape characteristics |
|---|---|---|---|---|---|---|---|---|---|
| | amount of coating before drying | thickness after drying ($t_B$) | $t_B/d_B$ | density of protrusions (number/mm²) | $ARa_B$ | $ARa_B^H$ | $ARa_B - ARa_B^H$ | traveling C/N | durability |
| C. Ex. 1 | 1.35 g/m² | 10 nm | 0.33 | 1.4 × 10⁷ | 17.0 nm | 16.5 nm | 0.03 | XX | ◉ |
| C. Ex. 2 | 1.35 g/m² | 10 nm | 0.33 | 1.3 × 10⁷ | 2.0 nm | 1.5 nm | 0.25 | XX | ○ |
| C. Ex. 3 | — | — | — | — | 0.6 nm | 0.6 nm | 0 | ○ | X |
| C. Ex. 4 | 1.35 g/m² | 10 nm | — | — | 0.5 nm | 0.4 nm | 0.20 | ◉ | X |
| C. Ex. 5 | 1.35 g/m² | 10 nm | 0.08 | 7.5 × 10⁵ | 5.7 nm | 4.4 nm | 0.23 | X | X |
| C. Ex. 6 | 1.35 g/m² | 10 nm | 0.33 | 6.5 × 10⁵ | 1.9 nm | 1.4 nm | 0.26 | ○ | X |
| C. Ex. 7 | 1.35 g/m² | 10 nm | 0.40 | 5.2 × 10⁸ | 3.6 nm | 3.0 nm | 0.17 | X | ○ |
| C. Ex. 8 | 0.675 g/m² | 1 nm | 0.03 | 1.6 × 10⁶ | 4.0 nm | 3.5 nm | 0.13 | X | X |
| C. Ex. 9 | 2.7 g/m² | 100 nm | 3.33 | 7.0 × 10⁶ | 1.0 nm | 0.7 nm | 0.30 | ○ | X |

C. EX. = Comparative Example
Note)
The film of Comparative Example 1 contains silica particles having an average particle diameter of 430 nm.

Abbreviations and symbols in Tables 1 to 3 mean the following.
PPDA*: p-phenylenediamine
3,4'-DAPE**: 3,4'-diaminodiphenyl ether
***: Acr-Pes→acryl modified polyester (IN-170–6 of Takamatsu Yushi Co., Ltd.)
Pes→polyester (RZ530 of Goo Kagaku Co., Ltd.)
Pur→polyurethane (MELUSI 545 of Toyo Polymer Co., Ltd.)
****: crosslinked acryl→polymethyl methacrylate-divinyl benzene crosslinked copolymer
core-shell particle (A)→core portion (whole diameter/core diameter=1.25)=polystyrene-divinylbenzene crosslinked copolymer, shell portion=polymethyl methacrylate
core-shell particle (B)→core portion (whole diameter/core diameter=10)=polystyrene-divinylbenzene crosslinked copolymer, shell portion=polymethyl methacrylate
silica→colloidal silica As is obvious from Examples 1 to 17, according to the present invention, even when the thickness of the base film is small, an aromatic polyamide film having sufficient strength and rigidity and especially useful as a base film for a high-density magnetic recording medium having excellent electromagnetic conversion characteristics, drop-out resistance and the excellent traveling durability of a magnetic layer can be provided.

Measurement methods employed in the following Examples 18 to 32 and Comparative Examples 10 to 18 are as follows.
(9) Average Particle Diameter I of Particles (Average Particle Diameter: 0.06 μm or More)
Same as (1) above.
(10) Average Particle Diameter II of Particles (Average Particle Diameter: Less than 0.06 μm)
Same as (2) above.
(11) HLB Value
(a) HLB Value of Each Surfactant
The HLB value of each surfactant is obtained from the following equation (8).

$$HLB = 20 \times Mn/M \tag{8}$$

wherein M is the molecular weight of the surfactant and Mn is the molecular weight of a hydrophilic group.
(b) Average HLB Value
The average HLB value is obtained from the following equation (9).

Average HLB value=HLB (X)×P(X)+HLB(Y)×P(Y)  (9)

wherein HLB(X) is the HLB value of the first surfactant X, P(X) is the weight fraction of the first surfactant X based on the average amount of the surfactants, HLB(Y) is the HLB value of the second surfactant Y, and P(Y) is the weight fraction of the second surfactant Y based on the average amount of the surfactants.

(12) Density of Protrusions Formed by Inert Fine Particles on the Surface of Coating Layer B The measurement of the density of protrusions on the surface of a film is carried out using a scanning electron microscope. That is, 25 photos of the surface of the layer B of the laminate film are taken at random at a magnification of 35,000× to count the density of surface protrusions, and the number of protrusions per 1 mm$^2$ is calculated from the average of count values and taken as the density of protrusions formed by inert fine particles on the surface of the layer B.

(13) Young's Modulus

Same as (7) above.

(14) Coating Failures and Stripe-shaped Coating Defects

The film is immersed in a dye solution having the following composition (at a temperature of 50° C.) for 10 minutes in such a manner that the coating layer B faces down, washed with water and observed with eyes. Oval or globular areas not dyed are taken as coating failures and longitudinal stripes are taken as stripe-shaped coating defects. The film having no coating failures and no stripe-shaped coating defects is evaluated as ○ and the film having these is evaluated as X.

(15) Production of Magnetic Tape and Evaluation of Characteristic Properties

The production of a magnetic tape and instruments used are the same as in (8) above.

(i) C/N Measurement

A signal having a recording wavelength of 0.5 μm (frequency of about 7.4 MHz) is recorded, and the ratio of values of its reproduced signal at 6.4 MHz and 7.4 MHz is taken as the C/N of the tape when the C/N of a deposited tape for a commercial 8 mm video is 0 dB. The C/N is evaluated based on the following criteria.

Criteria

◎: +5 dB or more compared with that of commercial 8 mm tape

○: +1 dB or more to less than 5 dB compared with that of commercial 8 mm tape

X: less than +1 dB compared with that of commercial 8 mm tape (ii) Drop Out

Using the drop out counter of Shibasoku Co., Ltd., the number of 3 μsecs/10 dB or more drop outs is counted for 10 minutes to obtain the number of the drop outs per 1 minute. The obtained value is evaluated based on the following criteria.

Criteria

◎: 10 (number/min) or less drop outs

X: 11 (number/min) or more drop outs (iii) Traveling Durability

An image signal having a frequency of 4.2 MHz is recorded on the above deposited tape which is then caused to repeatedly run 200 times and then, a change in the output of the signal is checked. A this test, one time running is carried out at a running speed of 41 m/min and a winding speed of 41 m/min under conditions of 25° C. and 50% RH. The traveling durability of the film is evaluated from the output change based on the following criteria.

Criteria

◎: The output change is −0.3 dB to 0 dB, after 200 times of traveling.

○: The output change is −0.6 dB or more and less than −0.3 dB, after 200 times of traveling.

X: The output change is less than −0.6 dB, after 200 times of traveling.

Example 18

A polymer solution (logarithmic viscosity of 3.5) was obtained by polymerizing 25 mol % of paraphenylenediamine and 25 mol % of 3,4-diaminodiphenyl ether as amine components and 50 mol % of terephthalic acid chloride as an acid component in NMP (N-methylpyrrolidone) and neutralizing the obtained polymer with calcium hydroxide to prepare a film forming stock solution.

This stock solution was cast on a metal belt heated at 100° C., dried at 100° C. for 2 minutes and further dried, while elevating temperature stepwise to 120° C and 150° C., for a total time of 10 minutes to give an unstretched film having self-holding properties. This unstretched film was peeled off from the belt continuously and introduced into a water tank to remove the solvent and the salt.

The obtained unstretched film was stretched to 2.5 times between low-speed and high-speed rolls at a film temperature of 350° C. and then supplied to a stenter to be stretched to 3.0 times at 400° C. The obtained biaxially oriented film was heat-treated at 400° C. for 1 minute and cooled to room temperature to give a film A. A water-soluble coating solution constituting a coating layer B described below was applied to this film A, heated gradually and dried at a maximum temperature of 200° C. for 4 seconds to obtain an aromatic polyamide film having a final thickness of 4.0 μm. The characteristic properties of the obtained film and a ferromagnetic metal thin film deposited magnetic tape comprising this film are shown in Table 4.

coating layer B:

binder: acryl modified polyester (IN-170–6 of Takamatsu Yushi Co., Ltd.)

inert fine particles: polymethyl methacrylate-divinylbenzene crosslinked copolymer having an average particle diameter of 30 nm (Epostar-ME of Nippon Shokubai Co., Ltd.)

surfactant X: 2 wt % of polyoxyethylene alkylphenyl ether having an HLB value of 12.6 (NS-208.5 of NOF Corporation) surfactant Y: 28 wt % of polyoxyethylene alkylphenyl ether having an HLB value of 17.2 (NS-230 of NOF Corporation) average HLB: 16.9

Examples 19 and 20

Aromatic polyamide base films were obtained in the same manner as in Example 18 except that the stretch ratio of the film A was changed as shown in Table 4. The characteristic properties of the obtained films and ferromagnetic metal thin film deposited magnetic tapes comprising these films are shown in Table 4.

Examples 21 and 22

Aromatic polyamide base films were obtained in the same manner as in Example 18 except that the types and/or contents of the first surfactant X and/or the second surfactant Y were changed as shown in Table 4. The characteristic properties of the obtained films and ferromagnetic metal thin film deposited magnetic tapes comprising these films are shown in Table 4.

TABLE 4

| | PDA*/3,4'-DAPE** ratio | stretch ratios | total of Young's moduli (longitudinal + transverse) | coating solution for coating layer B ||||||
|---|---|---|---|---|---|---|---|---|---|
| | | | | type of binder *** | type of particles **** | average particle diameter ($d_B$) | ***** surfactant X | HLB | content |
| Ex. 18 | 25/25 mol % | 2.5 × 3.0 = 7.5 | 2500 kg/mm² | Acr-Pes | crosslinked acryl | 30 nm | SAA1 | 12.6 | 2 wt % |
| Ex. 19 | 25/25 mol % | 2.0 × 3.25 = 6.5 | 2350 kg/mm² | Acr-Pes | crosslinked acryl | 30 nm | SAA1 | 12.6 | 2 wt % |
| Ex. 20 | 25/25 mol % | 2.8 × 2.8 = 7.8 | 2600 kg/mm² | Acr-Pes | crosslinked acryl | 30 nm | SAA1 | 12.6 | 2 wt % |
| Ex. 21 | 25/25 mol % | 2.5 × 3.0 = 7.5 | 2500 kg/mm² | Acr-Pes | crosslinked acryl | 30 nm | SAA1 | 12.6 | 10 wt % |
| Ex. 22 | 25/25 mol % | 2.5 × 3.0 = 7.5 | 2500 kg/mm² | Acr-Pes | crosslinked acryl | 30 nm | SAA1 | 12.6 | 0.5 wt % |

| | coating solution for coating layer B ||| | coating || tape characteristics |||
|---|---|---|---|---|---|---|---|---|---|
| | ***** surfactant Y | HLB | content | average HLB | density of protrusions (number/mm²) | failures and stripe-shaped coating defects | C/N | D/O | traveling durability |
| Ex. 18 | SAA2 | 17.2 | 28 wt % | 16.9 | 1.3 × 10⁷ | ○ | ◎ | ○ | ○ |
| Ex. 19 | SAA2 | 17.2 | 28 wt % | 16.9 | 1.3 × 10⁷ | ○ | ◎ | ○ | ○ |
| Ex. 20 | SAA2 | 17.2 | 28 wt % | 16.9 | 1.3 × 10⁷ | ○ | ◎ | ○ | ○ |
| Ex. 21 | SAA2 | 17.2 | 12 wt % | 15.1 | 1.3 × 10⁷ | ○ | ◎ | ○ | ○ |
| Ex. 22 | SAA2 | 17.2 | 38 wt % | 17.1 | 1.3 × 10⁷ | ○ | ◎ | ○ | ○ |

Ex. = Example

Examples 23 to 28

Aromatic polyamide base films were obtained in the same manner as in Example 18 except that the type of particles and/or the content of particles in total solids in the coating layer B were changed as shown in Table 5 and the density of protrusions on the surface of the coating layer B was changed as shown in Table 5. The characteristic properties of the obtained films and ferromagnetic metal thin film deposited magnetic tapes comprising these films are shown in Table 5.

Examples 29 and 30

Aromatic polyamide base films were obtained in the same manner as in Example 18 except that the binder resin contained in the coating layer B was changed as shown in Table 5 and further the compositions of the surfactants were changed as shown in Table 5. The characteristic properties of the obtained films and ferromagnetic metal thin film deposited magnetic tapes comprising these films are shown in Table 5.

Examples 31 and 32

Aromatic polyamide base films were obtained in the same manner as in Example 18 except that the copolymer composition of the amine components of the aromatic polyamide of the film A was changed as shown in Table 5. The characteristic properties of the obtained films and ferromagnetic metal thin film deposited magnetic tapes comprising these films are shown in Table 5.

TABLE 5

| | PDA*/3,4'-DAPE** ratio | stretch ratios | total of Young's moduli (longitudinal + transverse) | coating solution for coating layer B ||||||
|---|---|---|---|---|---|---|---|---|---|
| | | | | type of binder *** | type of particles **** | average particle diameter ($d_B$) | ***** surfactant X | HLB | content |
| Ex. 23 | 25/25 mol % | 2.5 × 3.0 = 7.5 | 2500 kg/mm² | Acr-Pes | crosslinked acryl | 60 nm | SAA1 | 12.6 | 2 wt % |
| Ex. 24 | 25/25 mol % | 2.5 × 3.0 = 7.5 | 2500 kg/mm² | Acr-Pes | crosslinked acryl | 15 nm | SAA1 | 12.6 | 2 wt % |
| Ex. 25 | 25/25 mol % | 2.5 × 3.0 = 7.5 | 2500 kg/mm² | Acr-Pes | Core-shell particle (A) | 30 nm | SAA1 | 12.6 | 2 wt % |
| Ex. 26 | 25/25 mol % | 2.5 × 3.0 = 7.5 | 2500 kg/mm² | Acr-Pes | Core-shell particle (B) | 30 nm | SAA1 | 12.6 | 2 wt % |
| Ex. 27 | 25/25 mol % | 2.5 × 3.0 = 7.5 | 2500 kg/mm² | Acr-Pes | Silica | 45 nm | SAA1 | 12.6 | 2 wt % |
| Ex. 28 | 25/25 mol % | 2.5 × 3.0 = 7.5 | 2500 kg/mm² | Acr-Pes | Silica | 15 nm | SAA1 | 12.6 | 2 wt % |

TABLE 5-continued

| | | | | | | | | | |
|---|---|---|---|---|---|---|---|---|---|
| Ex. 29 | 25/25 mol % | 2.5 × 3.0 = 7.5 | 2500 kg/mm² | Pes | crosslinked acryl | 30 nm | SAA1 | 12.6 | 4 wt % |
| Ex. 30 | 25/25 mol % | 2.5 × 3.0 = 7.5 | 2500 kg/mm² | Pur | crosslinked acryl | 30 nm | SAA1 | 12.6 | 2 wt % |
| Ex. 31 | 37.5/12.5 mol % | 2.5 × 3.0 = 7.5 | 2800 kg/mm² | Acr-Pes | crosslinked acryl | 30 nm | SAA1 | 12.6 | 2 wt % |
| Ex. 32 | 12.5/37.5 mol % | 2.5 × 3.0 = 7.5 | 2300 kg/mm² | Acr-Pes | crosslinked acryl | 30 nm | SAA1 | 12.6 | 2 wt % |

| | coating solution for coating layer B ***** | | | | coating | | | | |
|---|---|---|---|---|---|---|---|---|---|
| | | | | | density of | failures and | tape characteristics | | |
| | surfactant Y | HLB | content | average HLB | protrusions (number/mm²) | stripe-shaped coating defects | C/N | D/O | traveling durability |
| Ex. 23 | SAA2 | 17.2 | 28 wt % | 16.9 | 1.0 × 10⁷ | ○ | ○ | ○ | ⊚ |
| Ex. 24 | SAA2 | 17.2 | 28 wt % | 16.9 | 1.7 × 10⁷ | ○ | ⊚ | ○ | ○ |
| Ex. 25 | SAA2 | 17.2 | 28 wt % | 16.9 | 1.4 × 10⁷ | ○ | ⊚ | ○ | ○ |
| Ex. 26 | SAA2 | 17.2 | 28 wt % | 16.9 | 1.4 × 10⁷ | ○ | ⊚ | ○ | Δ |
| Ex. 27 | SAA2 | 17.2 | 28 wt % | 16.9 | 3.7 × 10⁶ | ○ | ○ | ○ | ⊚ |
| Ex. 28 | SAA2 | 17.2 | 28 wt % | 16.9 | 8.5 × 10⁷ | ○ | ⊚ | ○ | ⊚ |
| Ex. 29 | SAA3 | 17.8 | 21 wt % | 17.0 | 1.3 × 10⁷ | ○ | ⊚ | ○ | ○ |
| Ex. 30 | SAA2 | 17.2 | 28 wt % | 16.9 | 1.3 × 10⁷ | ○ | ⊚ | ○ | ○ |
| Ex. 31 | SAA2 | 17.2 | 28 wt % | 16.9 | 1.3 × 10⁷ | ○ | ⊚ | ○ | ○ |
| Ex. 32 | SAA2 | 17.2 | 28 wt % | 16.9 | 1.3 × 10⁷ | ○ | ○ | ○ | ○ |

Ex. = Example

Comparative Example 10

An aromatic polyamide base film was obtained in the same manner as in Example 18 except that silica having an average particle diameter of 160 nm and beforehand dispersed in NMP was added to a polymerization system after the completion of a neutralization reaction in the polymerization step to prepare a film forming stock solution. The characteristic properties of the obtained film and a ferromagnetic metal thin film deposited magnetic tape comprising this film are shown in Table 6. This film was inferior in electromagnetic conversion characteristics because its appropriate surface smoothness was impaired by large protrusions formed by particles contained in the film, especially coarse protrusions formed by the agglomerates of the particles.

Comparative Example 11

An aromatic polyamide base film was obtained in the same manner as in Example 18 except that the dried unstretched film was not stretched. The characteristic properties of the obtained film and a ferromagnetic metal thin film deposited magnetic tape comprising this film are shown in Table 6. This unstretched film was inferior in electromagnetic conversion characteristics due to its low Young's moduli.

Comparative Example 12

An aromatic polyamide base film was obtained in the same manner as in Example 18 except that the coating layer B was not formed. The characteristic properties of the obtained film and a ferromagnetic metal thin film deposited magnetic tape comprising this film are shown in Table 6. This film was inferior in traveling durability due to lack of fine protrusions.

Comparative Example 13

An aromatic polyamide base film was obtained in the same manner as in Example 18 except that particles were not contained in the coating layer B. The characteristic properties of the obtained film and a ferromagnetic metal thin film deposited magnetic tape comprising this film are shown in Table 6. This film was inferior in traveling durability due to lack of fine protrusions.

Comparative Examples 14 to 18

Aromatic polyamide base films were obtained in the same manner as in Example 18 except that the type and/or content of the first surfactant X and/or the second surfactant Y were changed as shown in Table 6. The characteristic properties of the obtained films and ferromagnetic metal thin film deposited magnetic tapes comprising these films are shown in Table 6. These films had coating defects such as coating failures and stripe-shaped coating defects and defects in the characteristic properties of a tape such as a drop out because the HLB values and/or contents of the surfactants do not satisfy the ranges of the present invention.

TABLE 6

| | PDA*/3,4'-DAPE** ratio | stretch ratios | total of Young's moduli (longitudinal + transverse) | type of binder *** | type of particles **** | average particle diameter ($d_B$) | ***** surfactant X | HLB | content |
|---|---|---|---|---|---|---|---|---|---|
| C. Ex. 10 | 25/25 mol % | 2.5 × 3.0 = 7.5 | 2500 kg/mm² | Acr-Pes | crosslinked acryl | 30 nm | SAA1 | 12.6 | 2 wt % |
| C. Ex. 11 | 25/25 mol % | 1.0 × 1.0 = 7.5 | 1200 kg/mm² | Acr-Pes | crosslinked acryl | 30 nm | SAA1 | 12.6 | 2 wt % |
| C. Ex. 12 | 25/25 mol % | 2.5 × 3.0 = 7.5 | 2500 kg/mm² | — | — | — | — | — | — |
| C. Ex. 13 | 25/25 mol % | 2.5 × 3.0 = 7.5 | 2500 kg/mm² | Acr-Pes | — | — | SAA1 | 12.6 | 2 wt % |
| C. Ex. 14 | 25/25 mol % | 2.5 × 3.0 = 7.5 | 2500 kg/mm² | Acr-Pes | crosslinked acryl | 30 nm | SAA1 | 12.6 | 12 wt % |
| C. Ex. 15 | 25/25 mol % | 2.5 × 3.0 = 7.5 | 2500 kg/mm² | Acr-Pes | crosslinked acryl | 30 nm | SAA1 | 12.6 | 20 wt % |
| C. Ex. 16 | 25/25 mol % | 2.5 × 3.0 = 7.5 | 2500 kg/mm² | Acr-Pes | crosslinked acryl | 30 nm | SAA1 | 12.6 | 2 wt % |
| C. Ex. 17 | 25/25 mol % | 2.5 × 3.0 = 7.5 | 2500 kg/mm² | Acr-Pes | crosslinked acryl | 30 nm | SAA1 | 12.6 | 2 wt % |
| C. Ex. 18 | 25/25 mol % | 2.5 × 3.0 = 7.5 | 2500 kg/mm² | Acr-Pes | crosslinked acryl | 30 nm | SAA1 | 12.6 | 2 wt % |

| | coating solution for coating layer B ***** | | | | coating | | tape characteristics | | |
|---|---|---|---|---|---|---|---|---|---|
| | surfactant Y | HLB | content | average HLB | density of protrusions (number/mm²) | failures and stripe-shaped coating defects | C/N | D/O | traveling durability |
| C. Ex. 10 | SAA2 | 17.2 | 28 wt % | 16.9 | 1.4 × 10⁷ | ○ | XX | ○ | ⊙ |
| C. Ex. 11 | SAA2 | 17.2 | 28 wt % | 16.9 | 1.3 × 10⁷ | ○ | XX | ○ | ○ |
| C. Ex. 12 | — | — | — | — | — | — | ○ | ○ | X |
| C. Ex. 13 | SAA2 | 17.2 | 28 wt % | 16.9 | — | ○ | ○ | ○ | X |
| C. Ex. 14 | — | — | — | 12.6 | 1.3 × 10⁷ | X | X | X | ○ |
| C. Ex. 15 | SAA2 | 17.2 | 28 wt % | 15.3 | 1.3 × 10⁷ | X | ○ | ○ | X |
| C. Ex. 16 | SAA2 | 17.2 | 5 wt % | 15.9 | 1.3 × 10⁷ | X | ○ | X | ○ |
| C. Ex. 17 | SAA2 | 17.2 | 45 wt % | 16.4 | 1.3 × 10⁷ | X | ○ | ○ | X |
| C. Ex. 18 | SAA4 | 18.7 | 30 wt % | 18.3 | 1.3 × 10⁷ | X | ○ | ○ | X |

C. Ex. = Comparative Example
Note)
The film of Comparative Example 10 contains silica particles having an average particle diameter of 160 nm.

Abbreviations and symbols in Tables 4 to 6 means the following.
*: PPDA→p-phenylenediamine
**: 3,4'-DAPE→3,4'-diaminodiphenyl ether
***: Acr-Pes→acryl modified polyester (IN-170-6 of Takamatsu Yushi Co., Ltd.)
Pes→polyester (RZ530 of Goo Kagaku Co., Ltd.)
Pur→polyurethane (MELUSI 545 of Toyo Polymer Co., Ltd.)
****: crosslinked acryl→polymethyl methacrylate-divinyl benzene crosslinked copolymer
  core-shell particle (A)→core portion (whole diameter/core diameter=1.25)=polystyrene-divinylbenzene crosslinked copolymer, shell portion=polymethyl methacrylate
  core-shell particle (B)→core portion (whole diameter/core diameter=10)=polystyrene-divinylbenzene crosslinked copolymer, shell portion=polymethyl methacrylate
  silica→colloidal silica
*****: SAA1→polyoxyethylene alkylphenyl ether (NS208.5 of NOF Corporation)
SAA2→polyoxyethylene alkylphenyl ether (NS230 of NOF Corporation)
SAA3→polyoxyethylene alkylphenyl ether (NS240 of NOF Corporation)
SAA4→polyoxyethylene alkylphenyl ether (NS270 of NOF Corporation)

As is obvious from Tables 4, 5 and 6, the film of the present invention exhibits excellent electromagnetic conversion characteristics, has excellent traveling durability and an extremely small number of fine protrusions which cause a drop out, and is free from such defects as coating failures and stripe-shaped coating defect s and excellent in winding properties. On the other hand, a film which does not satisfy the requirements of the present invention cannot achieve the above properties at the same time.

As is obvious from Examples 18 to 32, according to the present invention, there can be provided a laminate film for a high-density magnetic recording medium which has no protrusions which causes a drop out on the surface of a coating layer B and is useful for the production of a magnetic recording medium having excellent electromagnetic conversion characteristics and running properties.

Measurement methods employed in the following Examples 33 to 46 and Comparative Examples 19 to 29 are as follows.

(16) pH of Polymer Solution 5 g of a polymer solution is collected, added to 300 ml of water and stirred for 2 minutes, and the pH of the resulting aqueous solution is measured.

(17) Logarithmic Viscosity

The logarithmic viscosity of a polymer prepared by adding a polymer stock solution containing an aromatic polyamide after polymerization into a solvent such as an alcohol or water and re-precipitating and separating the polymer is measured in concentrated sulfuric acid at 30° C.

(18) Area Stretch Ratio

This is obtained by multiplying a stretch ratio in a longitudinal direction of the film by a stretch ratio in a transverse direction.

(19) Young's Modulus

Same as (7) above.

(20) Average Particle Diameter (DP) of Particles

Same as (1) above.

(21) Layer Thickness

A small piece of the film is fixed with an epoxy resin and a ultra thin piece having a thickness of about 60 nm is prepared (cut in. parallel to the running direction of the film) by a microtome. This sample is observed through a transmission electron microscope (H-800 model of Hitachi, Ltd.) to obtain the thickness of each layer by searching for the interface between layers.

(22) Surface Roughness (Center Line Average Roughness: Ra) of Film

The center line average roughness (Ra) is measured in accordance with JIS-B601. In the present invention, it is measured using the tracer type surface roughness meter (SURFCORDER SE-30C) of Kosaka Laboratories Ltd. under the following conditions.

(a) radius of tip of tracer: 2 $\mu$m
(b) measurement pressure: 30 mg
(c) cut-off: 0.08 mm
(d) measurement length: 8.0 mm
(e) filing of data: The surface roughness of the same sample is measured six times repeatedly, and the average of five measurement data excluding the largest one is taken as center line average roughness (Ra).

(23) Film/film Friction Coefficient

A glass sheet is placed under two films which are placed one upon the other in such a manner that the layer A of one film and the layer B of the other film come into contact with each other, the lower film (film in contact with the glass sheet) is taken off by a constant speed roll (about 10 cm/min), and a detector is fixed at one end of the upper film (end opposite to the take-off direction of the lower film) to detect tensile force (F) between the films. A sled placed on the upper film has a lower area of 50 cm$^2$ (80 mm×62.5 mm), a surface in contact with the film made from neoprene rubber having a hardness of 800 and a weight (W) of 1.2 kg. The film/film friction coefficient is calculated from the following equation (10).

$$\text{film/film friction coefficient} = F(g)/W(g) \quad (10)$$

(24) Deaeration Index

Twenty 8 cm×5 cm film pieces are superposed one upon another, and a triangle hole having 2 mm sides is formed in the centers of 19 film pieces excluding the topmost one. The deaeration time (unit: second) of this sample is measured at 2 mmHg five times using the Beck smoothness tester (Digibekk) of Toyo Seiki Co., Ltd., and the average of measurement values is taken as deaeration index.

(25) Rolled Form of Film

One hundred films with a length of 9,000 m and a width of 70 cm are rolled up and the obtained rolls having none of the following defects are counted as accepted ones and evaluated based on the following criteria.

defect 1: The ends of the roll are not aligned.
defect 2: Three or more protrusions are present on the surface of the roll.
defect 3: The roll is vertically wrinkled.

Criteria

⊚: 90 or more accepted rolls
◯: 80 to 89 accepted rolls
X: 79 or less accepted rolls

(26) Anti-block Properties

Two films are placed one upon the other in such a manner that the coated surface (layer A) of one film and the coated surface (layer B) of the other film come into contact with each other, a pressure of 50 kg/cm$^2$ is applied to these at 60° C. and 80% RH for 17 hours, and then the two films are separated from each other to evaluate peel strength (g/5 cm in width).

The anti-block properties are evaluated from the peel strength based on the following criteria.

Criteria

◯: less than 10 (g/5 cm in width)
Δ: 10 or more and less than 15 (g/5 cm in width)
X: 15 or more (g/5 cm in width) to rupture

(27) Chipping Resistance (a) Chipping by Calender

This is evaluated using a 3-stage mini-super calender (nylon roll×steel roll). The film is caused to run 2,000 m at a rate of 50 m/min at a treatment temperature of 80° C. and a linear pressure of 200 kg/cm. The chipping resistance of the film is evaluated from stains on the nylon roll of the calender based on the following criteria.

Criteria

⊚: The nylon roll is not stained at all.
◯: The nylon roll is slightly stained.
X: The nylon roll is heavily stained.

(b) Chipping by Pin

This is measured as follows using an apparatus shown in FIG. 1. In FIG. 1, reference numeral 1 is a wind-off reel, 2 a tension controller, 3, 5, 6, 8, 9 and 11 free rollers, 4 a tensiometer (inlet), 7 a fixed pin made from stainless steel SUS304 (outer diameter of 5 mm, surface roughness Ra of 20 nm), 10 a tensiometer (outlet), 12 a guide roller and 13 a take-up reel.

The coating layers (layers A and B) of the film cut to a width of ½ inch are brought into contact to the fixing pin 7 at θ=(90/180)π radian (90°) at a temperature of 20° C. and a humidity of 60%, and the film is caused to run 100 m at a rate of 2 m/min (inlet tension is constantly set to 40 g) to evaluate its chipping resistance based on the following criteria.

Criteria

⊚: No chippings are not adhered to the pin.
◯: A slight amount of chippings are adhered to the pin.
X: A large amount of chippings are adhered to the pin.

(28) Calender Projection

The surface roughness Ra of the coating layer (layer A) of the film which has been calendered under the same conditions and using the same apparatus used for the evaluation of chipping by calender in (27) (a) above is measured by the same method as described in the surface roughness of film (center line average roughness: Ra) (22) above.

The change rate of Ra is calculated from Ra of a film not calendered and Ra$^c$ of a film calendered based on the following equation (11), and calender projection is evaluated based on the following criteria.

$$\text{change rate of } Ra = (Ra^c - Ra)/Ra \quad (11)$$

Criteria
⊚: change rate of Ra≦0
◯: 0<change rate of Ra≦+0.2
X: +0.2<change rate of Ra

(29) Production and Evaluation of Characteristics of Magnetic Tape (a) Production of Coated Magnetic Tape (Examples 33 to 39 and Comparative Examples 19 to 29)

The following magnetic coating is applied to the surface of the coating layer (layer A) of the aromatic polyamide film so as to have a thickness of 1.2 μm, oriented in a DC magnetic field of 2,500 Gauss, heated to dryness at 120° C., subjected to supercalender treatment (linear pressure of 300kg/cm, temperature of 90° C.) and wound up. This take-up roll is left in an oven heated at 55° C. for 3 days. preparation of magnetic coating: The following composition is placed in a ball mill, kneaded for 16 hours and dispersed, and then, 5 parts by weight of an isocyanate compound (Desmodur L of Bayer AG) is added to the composition. The resulting mixture is sheared at a high speed to be dispersed for 1 hour to prepare a magnetic coating.

Composition of Magnetic Coating

| | |
|---|---|
| needle-shaped Fe particles | 100 parts by weight |
| vinyl chloride-vinyl acetate copolymer (Slec 7A of Sekisui Chemical Co., Ltd.) | 15 parts by weight |
| thermoplastic polyurethane resin | 5 parts by weight |
| chromium oxide | 5 parts by weight |
| carbon black | 5 parts by weight |
| lecitin | 2 parts by weight |
| aliphatic acid ester | 1 part by weight |
| toluene | 30 parts by weight |
| methyl ethyl ketone | 50 parts by weight |
| cyclohexanone | 70 parts by weight |

Further, the following coating solution is applied to a surface (coating layer B surface) opposite to the magnetic recording layer of the film as a back coat layer so as to have a thickness of 0.8 μm, dried and cut to produce a magnetic tape.

Composition of Back Coat Layer

| | |
|---|---|
| carbon black | 100 parts by weight |
| thermoplastic polyurethane resin | 60 parts by weight |
| isocyanate compound (Colonate L of Nippon Polyurethane Kogyo Co., Ltd.) | 18 parts by weight |
| silicone oil | 0.5 parts by weight |
| methyl ethyl ketone | 250 parts by weight |
| toluene | 50 parts by weight |

The characteristic properties of the obtained tape are measured using the following commercial instruments.

Instruments Used 8 mm video tape recorder: EDV-6000 of Sony Corporation C/N measurement: a noise meter of Shibasoku Co., Ltd.

(i) C/N Measurement A signal having a recording wavelength of 0.5 μm (frequency of about 7.4 MHz) is recorded, the ratio of values of its reproduced signal at 6.4 MHz and 7.4 MHz is taken as the C/N of the tape which is a relative value when the C/N of a video tape for a commercial 8 mm video is 0 dB, and 20 evaluated based on the following criteria.

Criteria
◯: 0 dB or more
Δ: −3 dB or more to less than 0 dB
X: less than −3 dB (ii) Drop Out (D/O) Measurement Using a drop out counter, the number of 15 μsec/18 dB drop outs per 1 minute is counted and evaluated based on the following criteria.

Criteria
◯: 0 to 19/min
AΔ20 to 49/min
X: 50/min or more (b) Production of Metal Thin Film Magnetic Tape (Examples 40 to 46)

The same coating solution as in (a) above is applied to the surface of the coating layer (layer B) of the aromatic polyamide film to a thickness of 0.8 μm as a back coat layer and dried.

Thereafter, two layers of 100% cobalt ferromagnetic thin films, are formed on the surface of the coating layer (layer A) so as to have a total thickness of 0.02 μm (each layer has a thickness of about 0.01 μm) by a vapor deposition method. A diamond-like carbon (DLC) layer and a fluorine-containing carboxylic acid-based lubricant layer are formed sequentially on the surface of these layers. Thereafter, the resulting laminate is slit into a 8 mm wide tape which is then loaded into a commercial 8 mm video cassette.

Then, (i) C/N (C/N of a commercial 8 mm video deposited tape used as a standard is 0 dB) and (ii) drop outs of the tape are measured by the same methods as in (a) above. Further, the traveling durability (iii) is measured as follows.

(iii) Traveling Durability

The C/N is measured after recording/reproduction are repeated 500 times at a tape running speed of 85 cm/min at 40° C. and 80% RH and a deviation from the initial value is evaluated based on the following criteria.

Criteria
⊚: +0.0 dB or more based on the initial value
◯: −1.0 or more and less than +0.0 dB based on the initial
X: less than −1.0 dB based on the initial value Example 33

25 mol % of paraphenylenediamine and 25 mol % of 3,4'-diaminodiphenyl ether as amine components and 50 mol % of terephthalic acid chloride as an acid component were polymerized in NMP (N-methylpyrrolidone). Calcium hydroxide having an average particle diameter of 8,000 nm (of Inoue Sekkai Co., Ltd.) was dispersed in NMP with a homogenizer, finely ground with a sand grinder to an average particle diameter of 1,500 nm and filtered with a filter (HDCII having a mesh size of 20 μm of Nippon Pole Co., Ltd.) to prepare an NMP slurry of calcium hydroxide having an average particle diameter of 800 nm. This slurry was added to the above polymer so as to have a pH of 3.8 to prepare a film forming stock solution. The logarithmic viscosity of this film forming stock solution was 3.5.

The obtained stock solution was heated at 100° C., cast on a metal belt heated at 1000 C from a nozzle heated at 1000 C, dried at 100° C. for 2 minutes and further dried, while elevating temperature stepwise to 120° C., 150° C. and 180° C., for a total time of 5 minutes to give an unstretched film having self-holding properties. This unstretched film was peeled off from the belt continuously, introduced into a water tank to remove the solvent and the salt and then dried at 180° C. for 3 minutes.

The obtained unstretched film was stretched to 2.5 times between low-speed and high-speed rolls at a film temperature of 350° C. and then supplied to a stenter to be stretched to 3.0 times at 400° C. The obtained biaxially oriented film was heat-treated at 400° C. for 1 minute and cooled at 35°

C. A layer A was formed on one side of the biaxially oriented film and then a layer B was formed on the other side to produce an aromatic polyamide film having a final thickness of 4.0 μm. Particles considered as the residual neutralizing agent could not be seen in the obtained film.

Layers A and B: The aqueous coating solutions containing a coating composition shown in Table 7 (both solutions use a water dispersion of a copolyester having the following composition as a binder resin and contain 5 wt % of polyoxyethylene nonylphenyl ether having an HLB value of 12.6; total solids content of 4 wt %) were applied by a kiss-roll coating method.

Composition of Copolyester
Acid Components

| | |
|---|---|
| 2,6-naphthalenedicarboxylic acid | 50 mol % |
| isophthalic acid | 45 mol % |
| 5-sodium sulfoisophthalic acid | 5 mol % |
| glycol components | |
| ethylene glycol | 70 mol % |
| bisphenol A adduct with propylene oxide | 30 mol % |

The glass transition temperature of this copolyester resin was 95° C.

The constitution of each coating layer and the characteristic properties of films and magnetic tapes are shown in Table 7.

Example 34

The procedure of Example 33 was repeated except that lithium hydroxide dispersed in NMP in advance was used as a neutralizing agent. Particles considered as the residual neutralizing agent could not be seen in the obtained film. The characteristic properties of the obtained film and magnetic tape are shown in Table 7.

Examples 35 to 39

The procedure of Example 33 was repeated except that the constitution of each coating layer was changed as shown in Table 7. The characteristic properties of the obtained films and magnetic tapes are shown in Table 7.

TABLE 7

| | Ex. 33 | Ex. 34* | Ex. 35 | Ex. 36 | Ex. 37 | Ex. 38 | Ex. 39 |
|---|---|---|---|---|---|---|---|
| stretch ratios | 2.5 × 3.0 | 2.5 × 3.0 | 2.5 × 3.0 | 2.5 × 3.0 | 2.5 × 3.0 | 2.5 × 3.0 | 2.5 × 3.0 |
| total of Young's moduli (longitudinal + transverse) | 2500 kg/mm$^2$ | 2500 kg/mm$^2$ | 2500 kg/mm$^2$ | 2500 kg/mm$^2$ | 2500 kg/mm$^2$ | 2500 kg/mm$^2$ | 2500 kg/mm$^2$ |
| material of inert fine particles X | silica | silica | silica | silicone | acryl | crosslinked polystyrene | silicone |
| average particle diameter of inert fine particles X (nm) | 30 | 30 | 100 | 20 | 25 | 35 | 30 |
| content of inert fine particles X (wt %) | 15 | 15 | 5 | 20 | 30 | 15 | 10 |
| thickness of coating layer A (nm) | 10 | 10 | 25 | 10 | 5 | 10 | 10 |
| surface roughness of coating layer A (nm) | 1.8 | 1.8 | 1.9 | 1.7 | 1.7 | 1.8 | 1.8 |
| material of inert fine particles Y | silica | silica | silica | crosslinked polystyrene | crosslinked polystyrene | silicone | silica |
| average particle diameter of inert fine particles Y (nm) | 220 | 220 | 120 | 330 | 240 | 110 | 220 |
| material of inert fine particles Z | silica | silica | silicone | silica | acryl | silica | silica |
| average particle diameter of inert fine particles Z (nm) | 80 | 80 | 50 | 60 | 25 | 70 | 80 |
| particle diameter ratio dy/dz | 2.8 | 2.8 | 2.4 | 5.5 | 9.6 | 1.6 | 2.8 |
| content of inert fine particles Y (wt %) | 5 | 5 | 10 | 1 | 2 | 15 | 5 |
| content of inert fine particles Z (wt %) | 25 | 25 | 20 | 30 | 25 | 25 | 25 |
| thickness of coating layer B (nm) | 25 | 25 | 20 | 40 | 15 | 30 | 25 |
| surface roughness of coating layer B (nm) | 5.3 | 5.3 | 4.2 | 6.0 | 4.9 | 4.3 | 5.3 |
| film/film friction coefficient | 0.41 | 0.41 | 0.42 | 0.33 | 0.29 | 0.39 | 0.40 |
| deaeration index (second) | 2700 | 2700 | 1800 | 1100 | 1200 | 3200 | 2600 |
| rolled form of film | ○ | ○ | ○ | ⊙ | ○ | ○ | ○ |
| anti-block properties | ○ | ○ | ○ | ○ | ○ | ○ | ○ |
| chipping resistance of layer A (pin) | ○ | ○ | ⊙ | ⊙ | ○ | ○ | ⊙ |
| chipping resistance of layer B (calender) | ○ | ○ | ⊙ | ○ | ○ | ⊙ | ⊙ |
| calender projection | ⊙ | ⊙ | ⊙ | ○ | ⊙ | ⊙ | ⊙ |
| C/N | ○ | ○ | ○ | ○ | ○ | ○ | ○ |

TABLE 7-continued

|  | Ex. 33 | Ex. 34* | Ex. 35 | Ex. 36 | Ex. 37 | Ex. 38 | Ex. 39 |
|---|---|---|---|---|---|---|---|
| drop out | ○ | ○ | ○ | ○ | ○ | ○ | ○ |

Ex. = Example
*: LiOH was used as a neutralizing agent in Example 34 whereas $Ca(OH)_2$ was used in other examples.

Comparative Example 19

The procedure of Example 33 was repeated except that the stretch ratios for forming a film were changed to 1.1×1.2 times. Particles considered as the residual neutralizing agent could not be seen in the obtained film. The characteristic properties of the obtained film and magnetic tape are shown in Table 8. The film was inferior in electromagnetic conversion characteristics due to insufficient Young's moduli.

Comparative Examples 20 and 21

The procedure of Example 33 was repeated except that only the layer A was formed or only the layer B was formed. The characteristic properties of the obtained films and magnetic tapes are shown in Table 8. They were inferior in winding properties and anti-block properties due to insufficient slipperiness caused by lack of surface protrusions on either of the layers.

Comparative Examples 22 and 23

The procedure of Example 33 was repeated except that the composition of particles contained in the coating layer B was changed as shown in Table 8. The characteristic properties of the obtained films and magnetic tapes are shown in Table 8. They were unsatisfactory in winding properties and inferior in anti-blocking properties.

Comparative Example 24

The procedure of Example 33 was repeated except that the thickness of the coating layer B was changed as shown in Table 8. The characteristic properties of the obtained film and magnetic tape are shown in Table 8. The film was unsatisfactory in winding properties and inferior in anti-blocking properties.

Comparative Example 25

The procedure of Example 33 was repeated except that the average particle diameter of the inert fine particles Y contained in the coating layer B was changed as shown in Table 8. The characteristic properties of the obtained film and magnetic tape are shown in Table 8. The particles fell off during processing and many drop outs caused thereby were produced.

TABLE 8

|  | C. Ex. 19 | C. Ex. 20 | C. Ex. 21 | C. Ex. 22 | C. Ex. 23 | C. Ex. 24 | C. Ex. 25 |
|---|---|---|---|---|---|---|---|
| stretch ratios | 1.1 × 1.2 | 2.5 × 3.0 | 2.5 × 3.0 | 2.5 × 3.0 | 2.5 × 3.0 | 2.5 × 3.0 | 2.5 × 3.0 |
| total of Young's moduli (longitudinal + transverse) | 1500 kg/mm$^2$ | 2500 kg/mm$^2$ | 2500 kg/mm$^2$ | 2500 kg/mm$^2$ | 2500 kg/mm$^2$ | 2500 kg/mm$^2$ | 2500 kg/mm$^2$ |
| material of inert fine particles X | silica | — | silica | silica | silica | silica | silica |
| average particle diameter of inert fine particles X (nm) | 30 | — | 30 | 30 | 30 | 30 | 30 |
| content of inert fine particles X (wt %) | 15 | 0 | 15 | 15 | 15 | 15 | 15 |
| thickness of coating layer A (nm) | 10 | 0 | 10 | 10 | 10 | 10 | 10 |
| surface roughness of coating layer A (nm) | 1.8 | 0.7 | 1.8 | 1.8 | 1.8 | 1.8 | 1.8 |
| material of inert fine particles Y | silica | silica | — | silica | — | silica | silica |
| average particle diameter of inert fine particles Y (nm) | 220 | 220 | — | 220 | — | 220 | 1200 |
| material of inert fine particles Z | silica | silica | — | — | silica | silica | silica |
| average particle diameter of inert fine particles Z (nm) | 80 | 80 | — | — | 80 | 80 | 80 |
| particle diameter ratio dy/dz | 2.8 | 2.8 | — | — | — | 2.8 | 15 |
| content of inert fine particles Y (wt %) | 5 | 5 | 0 | 5 | 0 | 5 | 5 |
| content of inert fine particles Z (wt %) | 25 | 25 | 0 | 0 | 25 | 25 | 25 |
| thickness of coating layer B (nm) | 25 | 25 | 0 | 25 | 25 | 120 | 25 |
| surface roughness of coating layer B (nm) | 5.3 | 5.3 | 0.8 | 5.3 | 5.3 | 0.9 | 20 |
| film/film friction coefficient | 0.41 | 0.93 | >1 | 0.50 | 0.71 | >1 | 0.25 |
| deaeration index (second) | 2700 | 7300 | 14000 | 8100 | 9400 | 14000 | 700 |
| rolled form of film | ○ | X | X | X | X | X | ○ |
| anti-block properties | ○ | X | X | X | X | X | ○ |
| chipping resistance of | ○ | ○ | ○ | ○ | ○ | ○ | ○ |

TABLE 8-continued

|  | C. Ex. 19 | C. Ex. 20 | C. Ex. 21 | C. Ex. 22 | C. Ex. 23 | C. Ex. 24 | C. Ex. 25 |
|---|---|---|---|---|---|---|---|
| layer A (pin) chipping resistance of layer B (calender) | ○ | ○ | ○ | ○ | ○ | ○ | X |
| calender projection | ◎ | ○ | ◎ | ◎ | ◎ | ○ | X |
| C/N | X | ○ | ○ | ○ | ○ | ○ | Δ |
| drop out | ○ | ○ | ○ | ○ | ○ | ○ | X |

C. Ex. = Comparative Example

Comparative Example 26

The procedure of Example 33 was repeated except that the average particle diameter of the inert fine particles Z contained in the coating layer B was changed as shown in Table 9. The characteristic properties of the obtained film and magnetic tape are shown in Table 9. The film was unsatisfactory in winding properties and inferior in anti-block properties.

Comparative Example 27

The procedure of Example 33 was repeated except that the average particle diameter of the inert fine particles X contained in the coating layer A was changed as shown in Table 9. The characteristic properties of the obtained film and magnetic tape are shown in Table 9. The film was unsatisfactory in electromagnetic conversion characteristics.

Comparative Example 28

An aromatic polyamide film was obtained in the same manner as in Example 33 except that silica dispersed in NMP in advance and having an average particle diameter of 430 nm was added to a polymerization system after the completion of a neutralization reaction in the polymerization step to prepare a film forming stock solution and that a coating layer was not formed on both sides of the aromatic polyamide film. The characteristic properties of the obtained film and magnetic tape are shown in Table 9. The film was unsatisfactory in electromagnetic conversion characteristics.

Comparative Example 29

An aromatic polyamide film was obtained in the same manner as in Example 33 except that the film forming stock solution (for layer C1 of the film) used in Example 33 and the film forming stock solution (for layer C2 of the film) used in Comparative Example 28 were controlled to ensure that the viscosity's of the both solutions became 1,000 poises at 100° C., and that the layer C1 having a thickness of 3.0 μm and the layer C2 having a thickness of 1.0 μm were placed one upon the other in the nozzle and cast on a metal belt in such a manner that the layer C2 came into contact with the metal belt to produce a film, and that a coating layer was not formed on both sides of the film. The characteristic properties of the obtained film and magnetic tape are shown in Table 9. Particles existent on the layer C2 side caused projection in the calendering step after the formation of the magnetic layer, thereby impairing the flatness of the surface of the layer C1 with the result of insufficient electromagnetic conversion characteristics. For the evaluation of the characteristic properties of the magnetic tape, a magnetic layer was formed on the surface of the layer C1 and a back coat layer was formed on the surface of the layer C2.

TABLE 9

|  | C. Ex. 26 | C. Ex. 27 | C. Ex. 28*1 | C. Ex. 29*2 |
|---|---|---|---|---|
| stretch ratios | 2.5 × 3.0 | 2.5 × 3.0 | 2.5 × 3.0 | 2.5 × 3.0 |
| total of Young's moduli (longitudinal + transverse) | 2500 kg/mm² | 2500 kg/mm² | 2500 kg/mm² | 2500 kg/mm² |
| material of inert fine particles X | silica | silica | — | — |
| average particle diameter of inert fine particles X (nm) | 30 | 500 | — | — |
| content of inert fine particles X (wt %) | 15 | 15 | 0 | 0 |
| thickness of coating layer A (nm) | 10 | 10 | 0 | 0 |
| surface roughness of coating layer A (nm) | 1.8 | 1.8 | 5.3 | 0.7 |
| material of inert fine particles Y | silica | silica | — | — |
| average particle diameter of inert fine particles Y (nm) | 220 | 220 | — | — |
| material of inert fine particles Z | silica | silica | — | — |
| average particle diameter of inert fine particles Z (nm) | 120 | 80 | — | — |
| particle diameter ratio dy/dz | 1.8 | 2.8 | — | — |
| content of inert fine particles Y (wt %) | 5 | 5 | 0 | 0 |
| content of inert fine particles Z (wt %) | 25 | 25 | 0 | 0 |
| thickness of coating layer B (nm) | 25 | 25 | 0 | 0 |
| surface roughness of coating layer B (nm) | 13.9 | 5.3 | 5.3 | 7.5 |
| film/film friction coefficient | 0.45 | 0.28 | 0.31 | 0.52 |
| deaeration index (second) | 6500 | 900 | 1700 | 7700 |
| rolled form of film | X | ◎ | ◎ | X |

TABLE 9-continued

|  | C. Ex. 26 | C. Ex. 27 | C. Ex. 28*1 | C. Ex. 29*2 |
|---|---|---|---|---|
| anti-block properties | X | ○ | ○ | ○ |
| chipping resistance of layer A (pin) | ○ | X | X | ⊚ |
| chipping resistance of layer B (calender) | X | ○ | X | X |
| calender protection | ○ | ○ | ○ | X |
| C/N | ○ | X | X | ○ |
| drop out | Δ | X | X | X |

C. Ex. = Comparative Example
*1: The base film contains silica particles having an average particle diameter of 430 nm.
*2: Coextruded base film (no particles on the magnetic layer side, whereas silica particles having an average particle diameter of 430 nm existent on the back coat layer side)

Examples 40 to 46

Aromatic polyamide films were obtained in the same manner as in Examples 33 to 39 except that in the composition of the coating layer A, an acryl modified polyester resin (IN-170–6 of Takamatsu Yushi Co., Ltd.) was used, as a binder resin, polyoxyethylene nonylphenyl ether having an HLB value of 12.6 and polyoxyethylene nonylphenyl ether having an HLB value of 17.2 were contained in an amount of 1 wt % and 26 wt %, respectively, based on the solids of the coating film, and average particle diameter and content of the inert fine particles X were changed as shown in Table 10. The characteristic properties of the obtained films and magnetic tapes are shown in Table 10. The films of Examples 40 to 46 had excellent traveling durability and showed excellent properties as a metal thin film magnetic tape.

TABLE 10

|  | Ex. 40 | Ex. 41* | Ex. 42 | Ex. 43 | Ex. 44 | Ex. 45 | Ex. 46 |
|---|---|---|---|---|---|---|---|
| stretch ratios | 2.5 × 3.0 | 2.5 × 3.0 | 2.5 × 3.0 | 2.5 × 3.0 | 2.5 × 3.0 | 2.5 × 3.0 | 2.5 × 3.0 |
| total of Young's moduli (longitudinal + transverse) | 2500 kg/mm$^2$ | 2500 kg/mm$^2$ | 2500 kg/mm$^2$ | 2500 kg/mm$^2$ | 2500 kg/mm$^2$ | 2500 kg/mm$^2$ | 2500 kg/mm$^2$ |
| material of inert fine particles X | acryl | acryl | silica | silicone | acryl | crosslinked polystyrene | silicone |
| average particle diameter of inert fine particles X (nm) | 30 | 30 | 100 | 20 | 30 | 35 | 30 |
| content of inert fine particles X (wt %) | 6 | 6 | 5 | 20 | 6 | 15 | 10 |
| thickness of coating layer A (nm) | 10 | 10 | 25 | 10 | 5 | 10 | 10 |
| surface roughness of coating layer A (nm) | 1.7 | 1.7 | 1.8 | 1.7 | 1.7 | 1.8 | 1.8 |
| material of inert fine particles Y | silica | silica | silica | crosslinked polystyrene | crosslinked polystyrene | silicone | silica |
| average particle diameter of inert fine particles Y (nm) | 220 | 220 | 120 | 330 | 240 | 110 | 220 |
| material of inert fine particles Z | silica | silica | silicone | silica | acryl | silica | silica |
| average particle diameter of inert fine particles Z (nm) | 80 | 80 | 50 | 60 | 25 | 70 | 80 |
| particle diameter ratio dy/dz | 2.8 | 2.8 | 2.4 | 5.5 | 9.6 | 1.6 | 2.8 |
| content of inert fine particles Y (wt %) | 5 | 5 | 10 | 1 | 2 | 15 | 5 |
| content of inert fine particles Z (wt %) | 25 | 25 | 20 | 30 | 25 | 25 | 25 |
| thickness of coating layer B (nm) | 25 | 25 | 20 | 40 | 15 | 30 | 25 |
| surface roughness of coating layer B (nm) | 5.3 | 5.3 | 4.2 | 6.0 | 4.9 | 4.3 | 5.3 |
| film/film friction coefficient | 0.49 | 0.51 | 0.47 | 0.43 | 0.41 | 0.50 | 0.50 |
| deaeration index (second) | 2700 | 2700 | 1800 | 1100 | 1200 | 3200 | 2600 |
| rolled form of film | ○ | ○ | ○ | ⊚ | ○ | ○ | ○ |
| anti-block properties | ○ | ○ | ○ | ○ | ○ | ○ | ○ |
| chipping resistance of layer A (pin) | ○ | ○ | ⊚ | ⊚ | ○ | ○ | ⊚ |
| C/N | ○ | ○ | ○ | ○ | ○ | ○ | ○ |
| drop out | ○ | ○ | ○ | ○ | ○ | ○ | ○ |
| traveling durability | ⊚ | ⊚ | ⊚ | ⊚ | ⊚ | ⊚ | ⊚ |

Ex. = Example
*: LiOH was used in Example 41 as a neutralizing agent, while Ca(OH)$_2$ was used in other examples.

As is obvious from Examples 33 to 46, according to the present invention, there can be provided a transferable aromatic polyamide film for a magnetic recording medium having excellent transferability, though the surface is flat, and excellent winding properties and electromagnetic conversion characteristics.

Measurement methods employed in the following Examples 47 to 58 and Comparative Examples 30 to 40 are as follows.
(30) pH of Polymer Solution
  Same as (16) above.
(31) Logarithmic Viscosity
  Same as (17) above.
(32) Area Stretch Ratio
  Same as (18) above.
(33) Young's Modulus
  Same as (7) above.
(34) Average Particle Diameter (DP) of Particles
  Same as (1) above.
(35) Layer Thickness
  Same as (21) above.
(36) Surface Roughness of Film (Center Line Average Roughness: Ra)
  Same as (22) above.
(37) Rolled Form of Film
  Same as (25) above.
(38) Chipping Resistance
  Same as (27) above.
(39) Calender Projection
  The change rate of Ra is obtained in the same manner as described in (28). Evaluation criteria are as follows.
Criteria
  ⊚: The change rate of Ra is +0.2 or less.
  ◯: The change rate of Ra is more than +0.2 and +1.0 or less.
  X: The change rate of Ra is more than +1.0.
(40) Production and Evaluation of Characteristic Properties of Magnetic Tape
  The same magnetic coating as that described in (29) (a) above is applied to the surface of the coating layer (layer B) of the aromatic polyamide film so as to have a thickness of 1.2 $\mu$m, oriented in a DC magnetic field of 2,500 Gauss, heated to dryness at 120° C., supercalendered (linear pressure of 300 kg/cm, temperature of 90° C.) and wound up. The wound roll is left in an oven heated at 55° C. for 3 days.
  Further, the same coating solution as that described in (29) (a) above is applied to a surface (coating layer A surface) opposite to the magnetic recording layer of the film to a thickness of 0.8 $\mu$m as a back coat layer, dried and cut to give a magnetic tape.
  Instruments used for the measurement of the characteristic properties of the tape and the measurement of C/N and drop outs are the same as those in (29) (a) above.

Example 47

25 mol % of paraphenylenediamine and 25 mol % of 3,4'-diaminodiphenyl ether as amine components and 50 mol % of terephthalic acid dichloride as an acid component were polymerized in NMP (N-methylpyrrolidone). Meanwhile, calcium hydroxide having an average particle diameter of 8,000 nm (of Inoue Sekkai Co., Ltd.) was dispersed in NMP with a homogenizer, finely ground with a sand grinder to an average particle diameter of 2,300 nm and filtered with a filter (HDCII having a mesh size of 50 $\mu$m of Nippon Pole Co., Ltd.) to prepare an NMP slurry of calcium hydroxide having an average particle diameter of 1,500 nm. This slurry was added to the above polymer in such an amount that the proportion of calcium hydroxide should become 50.3 mol % based on 50 mol % of terephthalic acid dichloride to prepare a film forming stock solution. The pH of this film forming stock solution was 4.7 and the logarithmic viscosity of the polymer was 3.5.

The obtained stock solution was heated at 100° C., cast on a metal belt heated at 100° C. from a nozzle heated at 100° C., dried at 100° C. for 2 minutes and further dried, while elevating temperature stepwise to 120° C. and 150° C., for a total time of 10 minutes to give an unstretched film having self-holding properties. This unstretched film was peeled off from the belt continuously, introduced into a water tank to remove the solvent and the salt and then dried at 150° C. for 15 minutes.

The obtained unstretched film was stretched to 2.5 times between low-speed and high-speed rolls at a film temperature of 350° C. and then supplied to a stenter to be stretched to 3.0 times at 400° C. The obtained biaxially oriented film was heat-treated at 400° C. for 1 minute and cooled at 350° C. A layer A was formed on one side of the biaxially oriented film and then a layer B was formed on the other side to obtain an aromatic polyamide film having a final thickness of 4.0 $\mu$m. The average particle diameter of the residual neutralizing agent contained in the obtained film was 300 nm.

Layers A and B: The aqueous coating solutions containing a coating composition shown in Table 11 (any of which solutions use a water dispersion of the following copolyester as a binder resin and contain 5 wt % of polyoxyethylene nonylphenyl ether having an HLB value of 12.6; total solids content of 4 wt %) were applied by a kiss-roll coating method.

Composition of Copolyester

| acid components | |
|---|---|
| 2,6-naphthalenedicarboxylic acid | 50 mol % |
| isophthalic acid | 45 mol % |
| 5-sodium sulfoisophthalic acid | 5 mol % |
| glycol components | |
| ethylene glycol | 70 mol % |
| bisphenol A adduct with propylene oxide | 30 mol % |

The glass transition temperature of this copolyester resin was 95° C.

The characteristic properties of the obtained film and magnetic tape are shown in Table 11.

Example 48

The procedure of Example 47 was repeated except that the layer B was not formed. The characteristic properties of the obtained film and magnetic tape are shown in Table 11.

Example 49

Calcium hydroxide which was the same neutralizing agent as in Example 47 was finely ground to an average particle diameter of 4,800 nm with a sand grinder to prepare an NMP slurry. This slurry was added to the above polymer in such an amount that the proportion of calcium hydroxide should become 50.06 mol % based on 50 mol % of terephthalic acid dichloride to prepare a film forming stock solution (a) (pH of 5.2, logarithmic viscosity of the polymer of 3.5).

Meanwhile, calcium hydroxide which was the same neutralizing agent as in Example 47 was finely ground to an average particle diameter of 2,000 nm with a sand grinder and filtered with a filter (HDCII having a mesh size of 20 pm of Nippon Pole Co., Ltd.) to prepare an NMP slurry of calcium hydroxide having an average particle diameter of 600 nm. This slurry was added to the above polymer in such an amount that the proportion of calcium hydroxide should become 51.5 mol % based on 50 mol % of terephthalic acid dichloride to prepare a film forming stock solution (b) (pH of 4.8, logarithmic viscosity of the polymer of 3.5).

The same amounts of the above film forming stock solutions (a) and (b) were mixed together to prepare a final film forming stock solution. An aromatic polyamide film was obtained in the same manner as in Example 48 except use of the above find film forming stock solution.

The particle size distribution of the residual neutralizing agent in the obtained film had maximum peaks at 500 nm and 180 nm. Other physical properties and characteristic properties of the film are shown in Table 11.

Example 50

Calcium hydroxide which is the same neutralizing agent as in Example 47 was finely ground to an average particle diameter of 2,000 nm with a sand grinder and filtered with a filter (HDCII having a mesh size of 20 $\mu$m of Nippon Pole Co., Ltd.) to prepare an NMP slurry of calcium hydroxide having an average particle diameter of 600 nm. An aromatic polyamide film was obtained in the same manner as in Example 48 except that this slurry was added to the above polymer in such an amount that the proportion of calcium hydroxide should become 50.4 mol % based on 50 mol % of terephthalic acid dichloride to prepare a film forming stock solution (pH of 4.8, logarithmic viscosity of the polymer of 3.5).

The average particle diameter of the residual neutralizing agent contained in the obtained film was 120 nm. Other physical properties and characteristic properties of the film are shown in Table 11.

Examples 51 to 58

The procedure of Example 47 was repeated except that a coating composition shown in Table 11 was employed. The characteristic properties of the obtained films and magnetic tapes of Examples 51 to 53 are shown in Table 11 and those of Examples 54 to 58 are shown in Table 12.

TABLE 11

|  | Ex. 47 | Ex. 48 | Ex. 49 | Ex. 50 | Ex. 51 | Ex. 52 | Ex. 53 |
|---|---|---|---|---|---|---|---|
| type of neutralizing agent | $Ca(OH)_2$ | $Ca(OH)_2$ | $Ca(OH)_2$ | $Ca(OH)_2$ | $Ca(OH)_2$ | $Ca(OH)_2$ | $Ca(OH)_2$ |
| particle diameter of neutralizing agent before addition (nm) | 1500 | 1500 | a) 6000 b) 700 | 600 | 1500 | 1500 | 1500 |
| particle diameter of neutralizing agent contained in film (nm) | 300 | 300 | a) 500 b) 180 | 120 | 300 | 300 | 300 |
| stretch ratios | 2.5 × 3.0 | 2.5 × 3.0 | 2.5 × 3.0 | 2.5 × 3.0 | 2.5 × 3.0 | 2.5 × 3.0 | 2.5 × 3.0 |
| total of Young's moduli (longitudinal + transverse) | 2500 kg/mm$^2$ | 2500 kg/mm$^2$ | 2500 kg/mm$^2$ | 2500 kg/mm$^2$ | 2500 kg/mm$^2$ | 2500 kg/mm$^2$ | 2500 kg/mm$^2$ |
| material of inert fine particles X | silica | silica | silica | silica | silica | crosslinked polystyrene | crosslinked polystyrene |
| average particle diameter of inert fine particles X (nm) | 220 | 220 | 220 | 220 | 120 | 330 | 240 |
| material of inert fine particles Y | silica | silica | silica | silica | silicone | silica | acryl |
| average particle diameter of inert fine particles Y (nm) | 80 | 80 | 80 | 80 | 50 | 60 | 25 |
| particle diameter ratio dx/dy | 2.8 | 2.8 | 2.8 | 2.8 | 2.4 | 5.5 | 9.6 |
| content of inert fine particles X (wt %) | 5 | 5 | 5 | 5 | 10 | 1 | 2 |
| content of inert fine particles Y (wt %) | 25 | 25 | 25 | 25 | 20 | 30 | 25 |
| thickness of coating layer A (nm) | 25 | 25 | 25 | 25 | 20 | 40 | 15 |
| material of inert fine particles Z | silica | — | — | — | silica | silicone | acryl |
| average particle diameter of inert fine particles Z (nm) | 30 | — | — | — | 100 | 20 | 25 |
| content of inert fine particles Z (wt %) | 15 | — | — | — | 5 | 20 | 30 |
| thickness of coating layer B (nm) | 10 | — | — | — | 25 | 10 | 5 |
| rolled form of film | ⊙ | ○ | ○ | ○ | ⊙ | ⊙ | ⊙ |
| chipping resistance of layer A (pin) | ○ | ○ | ○ | ○ | ⊙ | ○ | ○ |
| calender projection | ⊙ | ⊙ | ⊙ | ⊙ | ⊙ | ○ | ⊙ |
| C/N | ○ | ○ | ○ | ○ | ○ | ○ | ○ |
| drop out | ○ | ○ | ○ | ○ | ○ | ○ | ○ |

Ex. = Example

TABLE 12

| | Ex. 54 | Ex. 55 | Ex. 56 | Ex. 57 | Ex. 58 |
|---|---|---|---|---|---|
| type of neutralizing agent | Ca(OH)$_2$ | Ca(OH)$_2$ | Ca(OH)$_2$ | Ca(OH)$_2$ | Ca(OH)$_2$ |
| particle diameter of neutralizing agent before addition (nm) | 1500 | 1500 | 1500 | 1500 | 1500 |
| particle diameter of neutralizing agent contained in film (nm) | 300 | 300 | 300 | 300 | 300 |
| stretch ratios | 2.5 × 3.0 | 2.5 × 3.0 | 2.5 × 3.0 | 2.5 × 3.0 | 2.5 × 3.0 |
| total of Young's moduli (longitudinal + transverse) | 2500 kg/mm$^2$ | 2500 kg/mm$^2$ | 2500 kg/mm$^2$ | 2500 kg/mm$^2$ | 2500 kg/mm$^2$ |
| material of inert fine particles X | silica | silica | crosslinked polystyrene | crosslinked polystyrene | silicone |
| average particle diameter of inert fine particles X (nm) | 110 | 120 | 330 | 240 | 110 |
| material of inert fine particles Y | silica | silicone | silica | acryl | silica |
| average particle diameter of inert fine particles Y (nm) | 70 | 50 | 60 | 25 | 70 |
| particle diameter ratio dx/dy | 1.6 | 2.4 | 5.5 | 9.6 | 1.6 |
| content of inert fine particles X (wt %) | 15 | 10 | 1 | 2 | 15 |
| content of inert fine particles Y (wt %) | 25 | 20 | 30 | 25 | 25 |
| thickness of coating layer A (nm) | 30 | 20 | 40 | 15 | 30 |
| material of inert fine particles Z | crosslinked polystyrene | — | — | — | — |
| average particle diameter of inert fine particles Z (nm) | 35 | — | — | — | — |
| content of inert fine particles Z (wt %) | 15 | — | — | — | — |
| thickness of coating layer B (nm) | 10 | — | — | — | — |
| rolled form of film | ◎ | ○ | ○ | ○ | ○ |
| chipping resistance of layer A (pin) | ◎ | ◎ | ○ | ○ | ◎ |
| calender projection | ◎ | ◎ | ○ | ◎ | ◎ |
| C/N | ○ | ○ | ○ | ○ | ○ |
| drop out | ○ | ○ | ○ | ○ | ○ |

Ex. = Example

Comparative Example 30

The procedure of Example 48 was repeated except that the stretch ratios for forming a film were changed to 1.1×1.2 times. The characteristic properties of the obtained film and magnetic tape are shown in Table 13. As is obvious from Table 13, the film had insufficient Young's moduli, poor electromagnetic conversion characteristics and insufficient traveling stability.

Comparative Example 31

The procedure of Example 48 was repeated except that a layer A was not formed. The characteristic properties of the obtained film and magnetic tape are shown in Table 13. The film had unsatisfactory slipperiness and deaeration properties and was thereby inferior in winding properties.

Comparative Example 32

The procedure of Example 48 was repeated except that the pH of the film forming stock solution was controlled to 3.8. Particles considered as the residual neutralizing agent could not be found in the obtained film. The characteristic properties of the obtained film and magnetic tape are shown in Table 13. The film had unsatisfactory slipperiness and deaeration properties and was thereby inferior in winding properties.

Comparative Example 33

The procedure of Example 48 was repeated except that the pH of the film forming stock solution was controlled to 4.7 and calcium hydroxide was not ground. The average particle diameter of the residual neutralizing agent contained in the obtained film was 2,250 nm. The characteristic properties of the obtained film and magnetic tape are shown in Table 13. The film was inferior in electromagnetic conversion characteristics due to inappropriate surface properties and insufficient in chipping resistance due to voids formed by particles contained in the film.

Comparative Example 34

The procedure of Example 48 was repeated except that the thickness of the layer A was changed to 200 nm. The characteristic properties of the obtained film and magnetic tape are shown in Table 13. The film was inferior in winding properties.

Comparative Examples 35 and 36

The procedure of Example 48 was repeated except that the composition of particles contained in the layer A was changed as shown in Table 13. The characteristic properties of the obtained films and magnetic tape are shown in Table 13. Since the composition of the particles contained in the coating layer was outside the range, the film had improper slipperiness and deaeration properties and was thereby inferior in winding properties.

after the completion of a neutralization reaction in the polymerization step to prepare a film forming stock solution

TABLE 13

|  | C. Ex. 30 | C. Ex. 31 | C. Ex. 32 | C. Ex. 33 | C. Ex. 34 | C. Ex. 35 | C. Ex. 36 |
|---|---|---|---|---|---|---|---|
| type of neutralizing agent | $Ca(OH)_2$ | $Ca(OH)_2$ | $Ca(OH)_2$ | $Ca(OH)_2$ | $Ca(OH)_2$ | $Ca(OH)_2$ | $Ca(OH)_2$ |
| particle diameter of neutralizing agent before addition (nm) | 1500 | 1500 | 1500 | 8000 | 1500 | 1500 | 1500 |
| particle diameter of neutralizing agent contained in film (nm) | 300 | 300 | vanishing | 2250 | 300 | 300 | 300 |
| stretch ratios | 1.1 × 1.2 | 2.5 × 3.0 | 2.5 × 3.0 | 2.5 × 3.0 | 2.5 × 3.0 | 2.5 × 3.0 | 2.5 × 3.0 |
| total of Young's moduli (longitudinal + transverse) | 1500 $kg/mm^2$ | 2500 $kg/mm^2$ | 2500 $kg/mm^2$ | 2500 $kg/mm^2$ | 2500 $kg/mm^2$ | 2500 $kg/mm^2$ | 2500 $kg/mm^2$ |
| material of inert fine particles X | silica | — | silica | silica | silica | silica | — |
| average particle diameter of inert fine particles X (nm) | 220 | — | 220 | 220 | 220 | 220 | — |
| material of inert fine particles Y | silica | — | silica | silica | silica | — | silica |
| average particle diameter of inert fine particles Y (nm) | 80 | — | 80 | 80 | 80 | — | 80 |
| particle diameter ratio dx/dy | 2.8 | — | 2.8 | 2.8 | 2.8 | — | — |
| content of inert fine particles X (wt %) | 5 | 0 | 5 | 5 | 5 | 5 | 0 |
| content of inert fine particles Y (wt %) | 25 | 0 | 25 | 25 | 25 | 0 | 25 |
| thickness of coating layer A (nm) | 25 | 0 | 25 | 25 | 200 | 25 | 25 |
| material of inert fine particles Z | — | — | — | — | — | — | — |
| average particle diameter of inert fine particles Z (nm) | — | — | — | — | — | — | — |
| content of inert fine particles Z (wt %) | — | — | — | — | — | — | — |
| thickness of coating layer B (nm) | — | — | — | — | — | — | — |
| rolled form of film | ○ | X | X | ○ | X | X | X |
| chipping resistance of layer A (pin) | ○ | ○ | ○ | X | ○ | ○ | ○ |
| calender projection | ⊙ | ⊙ | ⊙ | ○ | ○ | ⊙ | ⊙ |
| C/N | X | ○ | ○ | X | ○ | ○ | ○ |
| drop out | ○ | ○ | ○ | X | ○ | ○ | ○ |

C. Ex. = Comparative Example

Comparative Example 37

The procedure of Example 48 was repeated except that the composition of particles contained in the layer A was changed as shown in Table 14. The characteristic properties of the obtained film and magnetic tape are shown in Table 14. The film was inferior in winding properties and chipping resistance and had many drop outs.

Comparative Example 38

The procedure of Example 48 was repeated except that the composition of particles contained in the layer A was changed as shown in Table 14. The characteristic properties of the obtained film and magnetic tape are shown in Table 14. Since the composition of particles contained in the coating layer was outside the range, the particles easily fell off and hence, the film had poor chipping resistance, many drop outs caused thereby and insufficient electromagnetic conversion characteristics.

Comparative Example 39

An aromatic polyamide film was obtained in the same manner as in Comparative Example 32 except that silica having an average particle diameter of 430 nm and dispersed in NMP in advance were added to a polymerization system and that the layer A was not formed. The characteristic properties of the obtained film and magnetic tape are shown in Table 14. The proper surface properties of the film were impaired by coarse particles formed by the agglomeration of particles with the result of insufficient electromagnetic conversion characteristics. The agglomerated particles formed voids, thereby deteriorating chipping resistance and producing many drop outs.

Comparative Example 40

An aromatic polyamide film was obtained in the same manner as in Example 48 except that the film forming stock solution (for layer C1 of the film) used in Comparative Example 32 and the film forming stock solution (for layer C2 of the film) used in Comparative Example 39 were controlled to ensure that the viscosity's of the both solutions became 1,000 poises at 100° C. and that the layer C1 having a thickness of 3.0 μm and the layer C2 having a thickness of 1.0 μm were placed one upon the other in the nozzle and cast on a metal belt in such a manner that the layer C2 came into contact with the metal belt to produce a film, and that the layer A was not formed. The characteristic properties of the obtained film and magnetic tape are shown in Table 14. Particles existent on the layer C2 side caused projection in the calendering step after the formation of the magnetic layer, thereby impairing the flatness of the surface of the layer C1 with the result of insufficient electromagnetic conversion characteristics. For the evaluation of the characteristic properties of the magnetic tape, a magnetic layer was formed on the surface of the layer C1 and a back coat layer was formed on the surface of the layer C2.

TABLE 14

|  | C. Ex. 37 | C. Ex. 38 | C. Ex. 39 | C. Ex. 40 |
|---|---|---|---|---|
| type of neutralizing agent | Ca(OH)$_2$ | Ca(OH)$_2$ | Ca(OH)$_2$ | Ca(OH)$_2$ |
| particle diameter of neutralizing agent before addition (nm) | 1500 | 1500 | 1500 | 1500 |
| particle diameter of neutralizing agent contained in film (nm) | 300 | 300 | vanishing * | vanishing ** |
| stretch ratios | 2.5 × 3.0 | 2.5 × 3.0 | 2.5 × 3.0 | 2.5 × 3.0 |
| total of Young's moduli (longitudinal + transverse) | 2500 kg/mm$^2$ | 2500 kg/mm$^2$ | 2500 kg/mm$^2$ | 2500 kg/mm$^2$ |
| material of inert fine particles X | silica | silica | — | — |
| average-particle diameter of inert fine particles X (nm) | 220 | 1200 | — | — |
| material of inert fine particles Y | silica | silica | — | — |
| average particle diameter of inert fine particles Y (nm) | 120 | 80 | — | — |
| particle diameter ratio dx/dy | 1.8 | 15 | — | — |
| content of inert fine particles X (wt %) | 5 | 5 | 0 | 0 |
| content of inert fine particles Y (wt %) | 25 | 25 | 0 | 0 |
| thickness of coating layer A (nm) | 25 | 25 | 0 | 0 |
| material of inert fine particles Z | — | — | — | — |
| average particle diameter of inert fine particles Z (nm) | — | — | — | — |
| content of inert fine particles Z (wt %) | — | — | — | — |
| thickness of coating layer B (nm) | — | — | — | — |
| rolled form of film | X | ◯ | ⊙ | ⊙ |
| chipping resistance of layer A (pin) | X | X | X | X |
| calender projection | ◯ | X | ◯ | X |
| C/N | ◯ | Δ | X | Δ |
| drop out | Δ | X | X | X |

C. Ex. = Comparative Example
*The base film contains silica particles having an average particle diameter of 430 nm.
**magnetic layer side of coextruded base film → no particles
back coat side → silica particles added As is obvious from Tables 11 to 14, it is understood that a magnetic tape formed from the film of the present invention has few drop outs, shows excellent electromagnetic conversion characteristics and is excellent in the transferability and winding properties of a base film whereas a magnetic tape which does not satisfy the requirements of the present invention cannot achieve these characteristic properties at the same time.

As is obvious from Examples 47 to 58, according to the present invention, there can be provided a transferable aromatic polyamide film which has excellent transferability, though its surface is flat, and excellent winding properties and electromagnetic conversion characteristics and is suitable for use as a base film for a high-density magnetic recording medium.

What is claimed is:
1. An aromatic polyamide film for a high-density magnetic recording medium, which comprises:
   (A) a biaxially oriented aromatic polyamide base film of an aromatic polyamide containing substantially no inert fine particles and having a total of Young's moduli in two directions crossing at right angles each other on the film plane, of at least 2,000 kg/mm$^2$; and
   (B) a coating layer comprising inert fine particles having an average particle diameter of 5 to 100 nm and a binder resin and formed on at least one side of the base film, the average particle diameter ($d_B$: nm) of the inert fine particles and the thickness ($t_B$: nm) of the coating layer satisfying the following expression (1):

$$0.05 \leq t_B/d_B \leq 0.8 \qquad (1)$$

and the coating layer having protrusions on its surface at a density of $1\times10^6$ to $1\times10^8$/ mm$^2$.

2. The aromatic polyamide film for a high-density magnetic recording medium according to claim 1, wherein the surface roughness of the coating layer B before and after it is heated at 200° C. for 120 minutes satisfies both of the following expressions (4) and (5) at the same time:

$$0 \leq (ARa_B - ARa_B^H)/ARa_B < 0.4 \qquad (4)$$

$$0.1 < ARa_B^H < 7 \qquad (5)$$

wherein $ARa_B$ is the center plane average roughness (nm) of the surface of the coating layer B before the heat treatment measured through an atomic force microscope, and $ARa_B^H$ is the center plane average roughness (nm) of the surface of the coating layer B after the heat treatment measured through an atomic force microscope, and the number of foreign substances adhered is 100/100 cm$^2$ or less.

3. The aromatic polyamide film for a high-density magnetic recording medium according to claim 1, wherein the inert fine particles contained in the coating layer B have a volume shape coefficient of 0.1 to π/6 and a core-shell structure that an exterior portion is softer than an interior portion thereof, and the particle diameter $d_{CB}$ (nm) of the core portion, the average particle diameter $d_B$ (nm) and $t_B$ (nm) satisfy the following relationships at the same time:

$$1.01 \leq d_B/d_{CB} \leq 3.0$$

$$0.05 \leq t_B/d_{CB} \leq 0.8$$

and the density of protrusions having a height of 0.5 μm or more, derived from macro agglomerates of particles b is 50/cm$^2$ or less.

4. The aromatic polyamide film for a high-density magnetic recording medium according to any one of claims 1 to 3, wherein the binder resin forming the coating layer B is an aqueous resin.

5. The aromatic polyamide film for a high-density magnetic recording medium according to any one of claims 1 to 4, wherein para-oriented aromatic nuclei substituent forming the main chain of the aromatic polyamide accounts for 50 to 99.5% of the total of aromatic nuclei forming the main chain of the aromatic polyamide.

6. The aromatic polyamide film for a high-density magnetic recording medium according to any one of claims 1 to 5, wherein the aromatic polyamide is a polymer compound comprising terephthalic acid as an acid component and p-phenylenediamine and 3,4'-diaminodiphenyl ether as amine components.

7. An aromatic polyamide film for a high-density magnetic recording medium comprising:

(A) a biaxially oriented aromatic polyamide base film of an aromatic polyamide containing substantially no inert fine particles and having a total of Young's moduli in two directions crossing at right angels each other on the film plane, of at least 2,000 kg/mm$^2$; and (B) a coating layer comprising inert fine particles, a surfactant and a binder resin and formed on at least one side of the base film, the surfactant consisting of a first surfactant having an HLB value of 10 to 14 and a second surfactant having an HLB value of 16 to 18.5, the average HLB value of the first surfactant and the second surfactant being 15 to 18, and the contents of each of the first surfactant and the second surfactant in the coating layer being 0.1 to 15 wt % and 10 to 40 wt % in terms of solids.

8. The aromatic polyamide film for a high-density magnetic recording medium according to claim 7, wherein the aromatic polyamide is a polymer compound comprising terephthalic acid as an acid component and p-phenylenediamine and 3,4'-diaminodiphenyl ether as amine components.

9. The aromatic polyamide film for a high-density magnetic recording medium according to claim 1 or 2, wherein the binder resin forming the coating layer B is selected from the group consisting of an aqueous polyester resin, aqueous acrylic resin, aqueous polyurethane resin and a combination thereof.

10. The aromatic polyamide film for a high-density magnetic recording medium according to any one of claims 1 to 3, wherein the inert fine particles contained in the coating layer B are heat resistant polymer particles having an average particle diameter of 10 to 50 nm.

11. The aromatic polyamide film for a high-density magnetic recording medium according to any one of claims 1 to 4, wherein the density of protrusions derived from the inert fine particles on the surface of the coating layer B is $2 \times 10^6$ to $2 \times 10^7 / mm^2$.

12. A transferable aromatic polyamide film for a high-density magnetic recording medium comprising:

(A) (A1) a laminate base film which comprises a biaxially oriented aromatic polyamide film of an aromatic polyamide containing substantially no inert fine particles and a total of Young's moduli in two directions crossing at right angles each other on the film plane being at least 2,000 kg/mm$^2$, and a first coating layer of 0.01 to 45 wt % of inert fine particles having an average particle diameter of 1 to 300 nm and a binder resin and formed on one side of the polyamide film, or (A2) a biaxially oriented aromatic polyamide base film of an aromatic polyamide containing internal inert fine particles composed of a compound represented by the following formula (2):

wherein M$^1$ is the elemental metal of the group Ia or IIa of the periodic table and x is 1 or 2, or a compound represented by the following formula (3):

wherein M$^1$ is the same as defined above and y is ½ or 1, and having an average particle diameter of 5 to 1,500 nm, a total of Young's moduli in two directions crossing at right angles each other on the film plane being at least 2,000 kg/mm$^2$; and (B) a second coating layer comprising two types of inert fine particles having different average particle diameters and a binder resin and formed on a side devoid of the coating layer of the laminate base film (A1) or on one side of the biaxially oriented aromatic polyamide base film (A2), the two types of inert fine particles consisting of first inert fine particles having an average particle diameter of 100 to 1,000 nm and second inert fine particles having an average particle diameter of 5 to 100 nm, the ratio of the average particle diameter of the first inert fine particles to the average particle diameter of the second inert fine particles being 1.2 or more, the contents of each of the first inert fine particles and the second inert fine particles in the second coating layer being 0.01 to 40 wt % and 1 to 70 wt % in terms of solids, the total of the contents of both particles being 75 wt % or less, and the thickness of the second coating layer being 1 nm or more but not more than the average particle diameter of the second inert fine particles.

13. The aromatic polyamide film for a magnetic recording medium according to claim 12, wherein para-oriented aromatic nuclei substituent forming the main chain of the aromatic polyamide accounts for 50 to 99.5% of the total of aromatic nuclei forming the main chain of the aromatic polyamide.

14. The aromatic polyamide film for a magnetic recording medium according to claim 12, wherein the aromatic polyamide is a polymer compound comprising terephthalic acid as an acid component and p-phenylenediamine and 3,4'-diaminodiphenyl ether as amine components.

15. The aromatic polyamide film for a magnetic recording medium according to any one of claims 1 to 3, wherein the ratio (dy/dz) of the average particle diameters of the two types of inert fine particles contained in the second coating layer is 1.3 or more.

16. The aromatic polyamide film for a magnetic recording medium according to any one of claims 1 to 4, wherein the friction coefficient between the laminate base film (A1) and the second coating layer is less than 0.6 and the deaeration index is 6,000 seconds or less.

17. The aromatic polyamide film for a magnetic recording medium according to claim 12 which comprises the biaxially oriented aromatic polyamide base film (A2), the second coating layer (B) and further a coating layer containing 0.01 to 50 wt % of inert fine particles having an average particle diameter of 1 to 300 nm on a surface opposite to the second coating layer (B) of the base film (A2).

18. The aromatic polyamide film according to claim 12, wherein the internal inert fine particles of the biaxially oriented aromatic polyamide base film are derived from the compound of the above formula (2) or (3) in an amount larger than its stoichiometric amount used to neutralize hydrogen chloride, which has been by-produced in the course of the production of the aromatic polyamide by an acide chloride process.

19. The aromatic polyamide film according to claim 12, wherein the thickness of the second coating layer is 4 nm or more but not more than the average particle diameter of the second inert fine particles.

20. The aromatic polyamide film according to claim 12, wherein the thickness of the first coating layer is 1/100 or more of the average particle diameter of the inert fine particles contained in the first coating layer but less than the average particle diameter thereof.

21. Use of the aromatic polyamide film of claim 1, 7 or 12 as a base film for a high-density magnetic recording medium.

22. A high-density magnetic recording medium comprising the aromatic polyamide film of claim 1 or 7 and a metal thin film magnetic layer formed on the coating layer B of the aromatic polyamide film.

23. A high-density magnetic recording medium comprising the aromatic polyamide film of claim 1 or 7 and a multi-layer coated magnetic layer formed on the coating layer B of the aromatic polyamide film.

24. A high-density magnetic recording medium comprising the aromatic polyamide film of claim 12 which comprises the laminate base film (A1) and the second coating layer (B) and a metal thin film magnetic layer formed on the first coating layer of the laminate base film (A1).

25. A high-density magnetic recording medium comprising the aromatic polyamide film of claim 12 which comprises the laminate base film (A1) and the second coating layer (B) and a multi-layer coated magnetic layer formed on the first coating layer of the laminate base film (A2).

26. A high-density magnetic recording medium comprising the aromatic polyamide film of claim 12 which comprises the laminate base film (A2) and the second coating layer (B) and a metal thin film magnetic layer formed on a surface opposite to the second coating layer of the laminate base film (A2).

27. A high-density magnetic recording medium comprising the aromatic polyamide film of claim 12 which comprises the laminate base film (A2) and the second coating layer (B) and a multi-layer coated magnetic layer formed on a surface opposite to the second coating layer of the laminate base film (A2).

* * * * *